US012573707B2

(12) United States Patent
Murakami

(10) Patent No.: US 12,573,707 B2
(45) Date of Patent: Mar. 10, 2026

(54) ELECTRICAL APPARATUS

(71) Applicant: MAKITA CORPORATION, Anjo (JP)

(72) Inventor: Junichi Murakami, Anjo (JP)

(73) Assignee: MAKITA CORPORATION, Anjo (JP)

( * ) Notice: Subject to any disclaimer, the term of this patent is extended or adjusted under 35 U.S.C. 154(b) by 660 days.

(21) Appl. No.: 18/019,154

(22) PCT Filed: Aug. 6, 2021

(86) PCT No.: PCT/JP2021/029395
§ 371 (c)(1),
(2) Date: Feb. 1, 2023

(87) PCT Pub. No.: WO2022/044789
PCT Pub. Date: Mar. 3, 2022

(65) Prior Publication Data
US 2024/0250374 A1 Jul. 25, 2024

(30) Foreign Application Priority Data

Aug. 25, 2020 (JP) ................................ 2020-142075

(51) Int. Cl.
| | |
|---|---|
| *H01M 50/296* | (2021.01) |
| *H01M 10/46* | (2006.01) |
| *H02J 7/00* | (2006.01) |

(52) U.S. Cl.
CPC ......... *H01M 50/296* (2021.01); *H01M 10/46* (2013.01); *H02J 7/0045* (2013.01)

(58) Field of Classification Search
CPC .... H01M 50/296; H01M 10/46; H02J 7/0045; H02J 7/0042; Y02E 60/10
(Continued)

(56) References Cited

U.S. PATENT DOCUMENTS 5,366,826 A * 11/1994 McCormick ........ H01M 50/204
429/96
5,448,151 A * 9/1995 Ganse ................... H02J 7/0042
320/107
(Continued)

FOREIGN PATENT DOCUMENTS

CN 103241337 B * 12/2016 .............. B62J 11/00
JP H06-197459 A 7/1994
(Continued)

OTHER PUBLICATIONS

Sep. 7, 2021 International Search Report Issued in International Patent Application No. PCT/JP2021/029395.
(Continued)

*Primary Examiner* — M Baye Diao
(74) *Attorney, Agent, or Firm* — Oliff PLC

(57) ABSTRACT

An electrical apparatus to which a battery pack including a battery-side terminal is to be detachably attached is disclosed. The electrical apparatus includes: a body case comprising an upper wall having an opening and a bottom wall; and a terminal unit covering the opening from above and including an apparatus-side terminal corresponding to the battery-side terminal. A first rib is disposed at least partially around the opening and extends upward from an upper surface of the upper wall. When the electrical apparatus is viewed from above, the first rib overlaps the terminal unit.

10 Claims, 36 Drawing Sheets

(58) Field of Classification Search
USPC ......................................................... 320/113
See application file for complete search history.

(56) References Cited

U.S. PATENT DOCUMENTS

| | | | | |
|---|---|---|---|---|
| 6,346,793 | B1 * | 2/2002 | Shibata | H02J 7/0042 |
| | | | | 429/97 |
| 9,368,842 | B2 * | 6/2016 | Johnson | H01M 50/213 |
| 9,577,228 | B2 * | 2/2017 | Naito | H01M 50/50 |
| 9,966,772 | B2 * | 5/2018 | Uesugi | H02J 7/04 |
| 10,818,882 | B2 * | 10/2020 | Zhang | H01M 50/291 |
| 11,211,804 | B2 * | 12/2021 | Murakami | H02J 7/0045 |
| 12,117,015 | B2 * | 10/2024 | Mizutani | H05K 7/20172 |
| 2004/0135542 | A1 | 7/2004 | Ito | |
| 2006/0159991 | A1 * | 7/2006 | Takeshita | H01M 50/213 |
| | | | | 429/123 |
| 2015/0357612 | A1 * | 12/2015 | Uchida | H01M 50/213 |
| | | | | 429/99 |
| 2015/0375416 | A1 * | 12/2015 | Haneda | B25F 5/02 |
| | | | | 30/383 |
| 2019/0334359 | A1 * | 10/2019 | Asai | H02J 7/0045 |
| 2022/0003825 | A1 * | 1/2022 | Horie | G01R 19/16542 |

FOREIGN PATENT DOCUMENTS

| | | |
|---|---|---|
| JP | H10-174301 A | 6/1998 |
| JP | 2004-147360 A | 5/2004 |

OTHER PUBLICATIONS

Sep. 7, 2021 Written Opinion Issued in International Patent Application No. PCT/JP2021/029395.

* cited by examiner

Apparatus System <u>2</u>

FIG. 4

UP
REAR
RIGHT
LEFT
FRONT
DOWN 212a
(212b)

210a
(210b)

230a    202

74

200

214a
(214b)

230c(230d)

220

16

252

44

216a
(216b)

218a(218b)

72

76

10

70

20

34     A     90

UP

FRONT ⟷ REAR

DOWN

UP

REAR

RIGHT

LEFT

FRONT

DOWN (Second Embodiment)

(Second Embodiment)

(Third Embodiment)

(Third Embodiment)

UP
REAR
LEFT
RIGHT
FRONT
DOWN (Third Embodiment)

(Third Embodiment)

REAR

RIGHT ← → LEFT

FRONT

FIG. 32

(Third Embodiment)

618
703
700a
690
680
692
702f 702e 702d 702c 702b 702a
682
700b
694

UP
REAR
LEFT
RIGHT
FRONT
DOWN

FIG. 33

(Third Embodiment)

(Third Embodiment)

(Third Embodiment)

ELECTRICAL APPARATUS

TECHNICAL FIELD

The technique disclosed herein relates to an electrical apparatus.

BACKGROUND ART

Japanese Patent Application Publication No. 2004-147360 describes an electrical apparatus to which a battery pack including a battery-side terminal is to be detachably attached. The electrical apparatus includes: an upper wall having an opening; a bottom wall; and a terminal unit attached to the opening from below and including an apparatus-side terminal corresponding to the battery-side terminal.

SUMMARY OF INVENTION

Technical Problem

In the electrical apparatus of Japanese Patent Application Publication No. 2004-147360, entry of water from above into its body case is suppressed by the terminal unit. However, there is a minute space between the terminal unit and a portion defining the opening in the upper wall of the body case. Thus, water that has reached an upper surface of the upper wall of the body case may adversely enter the body case through the upper surface of the upper wall of the body case and the space.

The present disclosure discloses a technique capable of suppressing entry of water into a body case of an electrical apparatus.

Solution to Technical Problem

The present disclosure discloses an electrical apparatus to which a battery pack including a battery-side terminal is to be detachably attached. The electrical apparatus may comprise: a body case comprising an upper wall having an opening and a bottom wall; and a terminal unit covering the opening from above and including an apparatus-side terminal corresponding to the battery-side terminal, wherein a first rib extending upward from an upper surface of the upper wall may be disposed at least partially around the opening, and when the electrical apparatus is viewed from above, the first rib may overlap the terminal unit.

According to the above configuration, by virtue of the terminal unit covering the opening in the upper wall from above, entry of water into the body case from above can be suppressed. Moreover, by the first rib, it is possible to suppress water that has reached the upper surface outward of the opening and the first rib from adversely entering the body case through the opening. Accordingly, entry of water into the body case of the electrical apparatus can be suppressed.

BRIEF DESCRIPTION OF DRAWINGS

FIG. 4 is a cross-sectional view along a IV-IV line of FIG. 3.

FIG. 32 is a perspective view of the terminal unit 618 of the third embodiment viewed from the left lower rear side.

FIG. 33 is a rear view of the terminal unit 618 of the third embodiment, viewed from the rear side.

DESCRIPTION OF EMBODIMENTS

Figure 1:
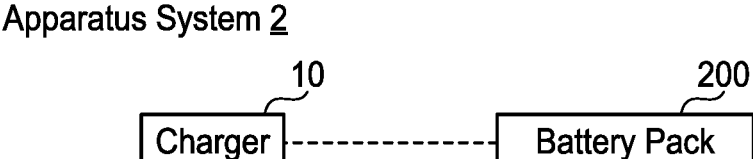
FIG. 1 is a block diagram of an apparatus system 2 of a first embodiment.

In one or more embodiments, the electrical apparatus may comprise: a body case comprising an upper wall having an opening and a bottom wall; and a terminal unit covering the opening from above and including an apparatus-side terminal corresponding to the battery-side terminal, wherein a first rib extending upward from an upper surface of the upper wall may be disposed at least partially around the opening, and when the electrical apparatus is viewed from above, the first rib may overlap the terminal unit.

In one or more embodiments, the first rib may be in contact with a lower surface of the terminal unit.

According to the above configuration, it is possible to suppress water that has reached the upper end of the first rib from entering the body case.

In one or more embodiments, a second rib extending downward from a lower surface of the terminal unit may be disposed at the lower surface. The first rib may face the second rib.

According to the above configuration, entry of water toward the opening beyond the first rib can be suppressed by the second rib. Accordingly, entry of water into the body case of the electrical apparatus can further be suppressed.

In one or more embodiments, an inclined portion may be disposed on the upper surface, the inclined portion may incline such that a first side of a first direction orthogonal to an up-down direction is located lower than a second side of the first direction. In the first direction, the first rib may be disposed on the second side of the opening.

According to the above configuration, in the first direction, water that has reached the upper surface of the upper wall on the second side of the opening flows from the second side to the first side. Then, the water that has reached the first rib flows in a direction orthogonal to the up-down direction and the first direction, and then further flows from the second side to the first side. In other words, the water flows outside the opening. Thus, it is possible to suppress accumulation of water around the opening and suppress entry of the water into the body case of the electrical apparatus through the opening.

In one or more embodiments, the body case may comprise a through hole penetrating the upper wall in the up-down direction, the terminal unit comprises a protruding part extending downward from a lower surface of the terminal unit, the protruding part having a shape corresponding to the through hole and configured to have a screw attached from below. A diameter of the through hole may be larger than an outer diameter of the protruding part, an outer diameter of a flange of the screw may be larger than the diameter of the through hole. When the screw is screwed into the protruding part, the body case may be clamped by the screw and the terminal unit in the up-down direction.

If the apparatus-side terminal and the battery-side terminal unintentionally comes into contact with each other upon attachment of the battery pack to the electrical apparatus, there is a risk of deformation of the apparatus-side terminal and the battery-side terminal. For example, when a position of the apparatus-side terminal is displaced with respect to the battery-side terminal in a direction orthogonal to the up-down direction (hereafter referred to as "horizontal direction"), the unintended contact occurs. According to the aforementioned configuration, under the state where the terminal unit and the body case are assembled, the terminal unit can move in the horizontal direction with respect to the body case. Thus, even when the position of the apparatus-side terminal is displaced with respect to the battery-side terminal in the horizontal direction, the apparatus-side terminal comes to a correct position with respect to the battery-side terminal by the terminal unit moving with respect to the battery pack. Thus, it is possible to suppress occurrence of the unintended contact between the apparatus-side terminal and the battery-side terminal upon attachment of the battery pack to the electrical apparatus, and it is possible to suppress deformation of the apparatus-side terminal and the battery-side terminal.

In one or more embodiments, the body case may include the two through holes, the two through holes may face each other across the opening, and the terminal unit may comprise the two protruding parts corresponding to the two through holes.

According to the above configuration, the body case can firmly be clamped by the screws and the terminal unit.

In one or more embodiments, the electrical apparatus may further comprise a hook attached to the terminal unit outside the body case and configured to engage with a groove of the battery pack.

When the hook is attached to the terminal unit inside the body case, an opening for the hook to extends from within the body case to the outside needs to be defined in the body case. In this case, water may enter the body case of the electrical apparatus through the opening. According to the aforementioned configuration, by virtue of the hook being attached to the terminal unit outside the body case, it is not necessary to define an opening in the body case for the hook to extends from within the body case to the outside thereof. Accordingly, entry of water into the body case of the electrical apparatus can be suppressed.

In one or more embodiments, the electrical apparatus may further comprise a terminal cover attached to an upper wall of the body case. The terminal cover may cover a part of the terminal unit and a part of the upper wall from above.

According to the above configuration, by virtue of the terminal unit coving a part of the upper wall, entry of water into the body case from above can further be suppressed.

In one or more embodiments, the electrical apparatus may be a charger.

When the electrical apparatus is a charger, it is necessary to suppress entry of water into the body case. According to the above configuration, entry of water into the body case of the charger can be suppressed by the terminal unit and the first rib.

First Embodiment

With reference to FIGS. 1 to 25, an apparatus system 2 of an embodiment will be described. As illustrated in FIG. 1 and FIG. 25, the apparatus system 2 includes a battery pack 200 and a charger 10 to which the battery pack 200 is to be detachably attached. The charger 10 is a battery-related apparatus for charging the battery pack 200. The battery pack 200 is a power source to supply power to a working machine such as a lawn mower (not illustrated). The battery pack 200 is configured to be detachably attached to the working machine. The charger 10 is configured to charge the battery pack 200 in the state of being detached from the working machine. Hereafter, when the charger 10 of FIG. 2 is placed on a placement surface, a direction orthogonal to the placement surface will be referred to as an up-down direction, a direction orthogonal to the up-down direction will be referred to as a left-right direction, and a direction orthogonal to the up-down direction and the left-right direction will be referred to as a front-rear direction.

(Configuration of Charger 10)

Figure 2:
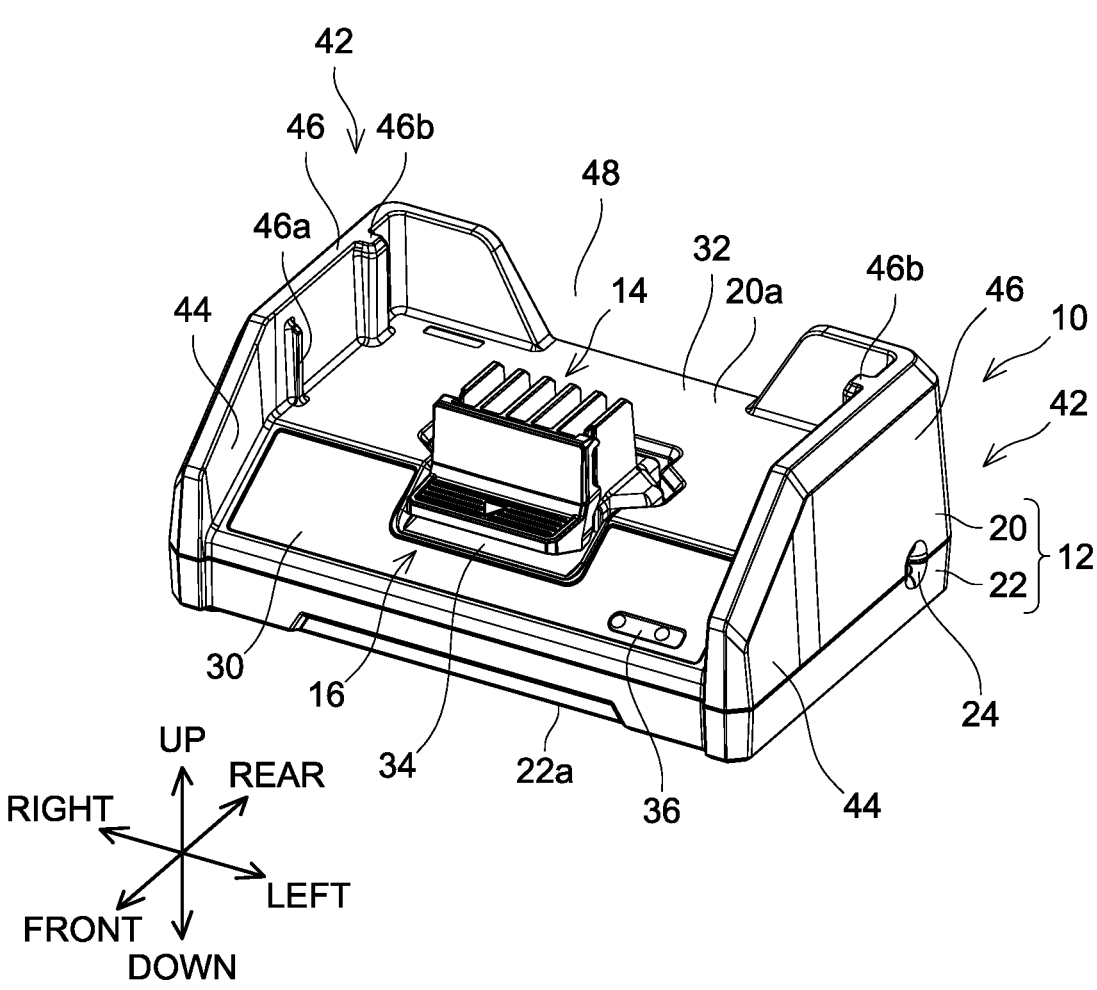
FIG. 2 is a perspective view of a charger 10 of the first embodiment viewed from the left upper front side.

With reference to FIG. 2 to FIG. 11, the charger 10 will be described. As illustrated in FIG. 2, the charger 10 includes a body case 12, a terminal unit 14 and hook 16. The body case 12 includes an upper case 20 and a lower case 22. The upper case 20 and the lower case 22 are fixed to each other by screws (not illustrated). When the charger 10 is placed on the placement surface, a bottom wall 22a of the lower case 22 faces the placement surface. A cable opening 24 defined by the upper case 20 and the lower case 22 being fixed to each other is provided at a lower portion of the left surface of the body case 12. The cable opening 24 is an opening to allow a power cable (not illustrated) to extend therethrough.

Figure 4:
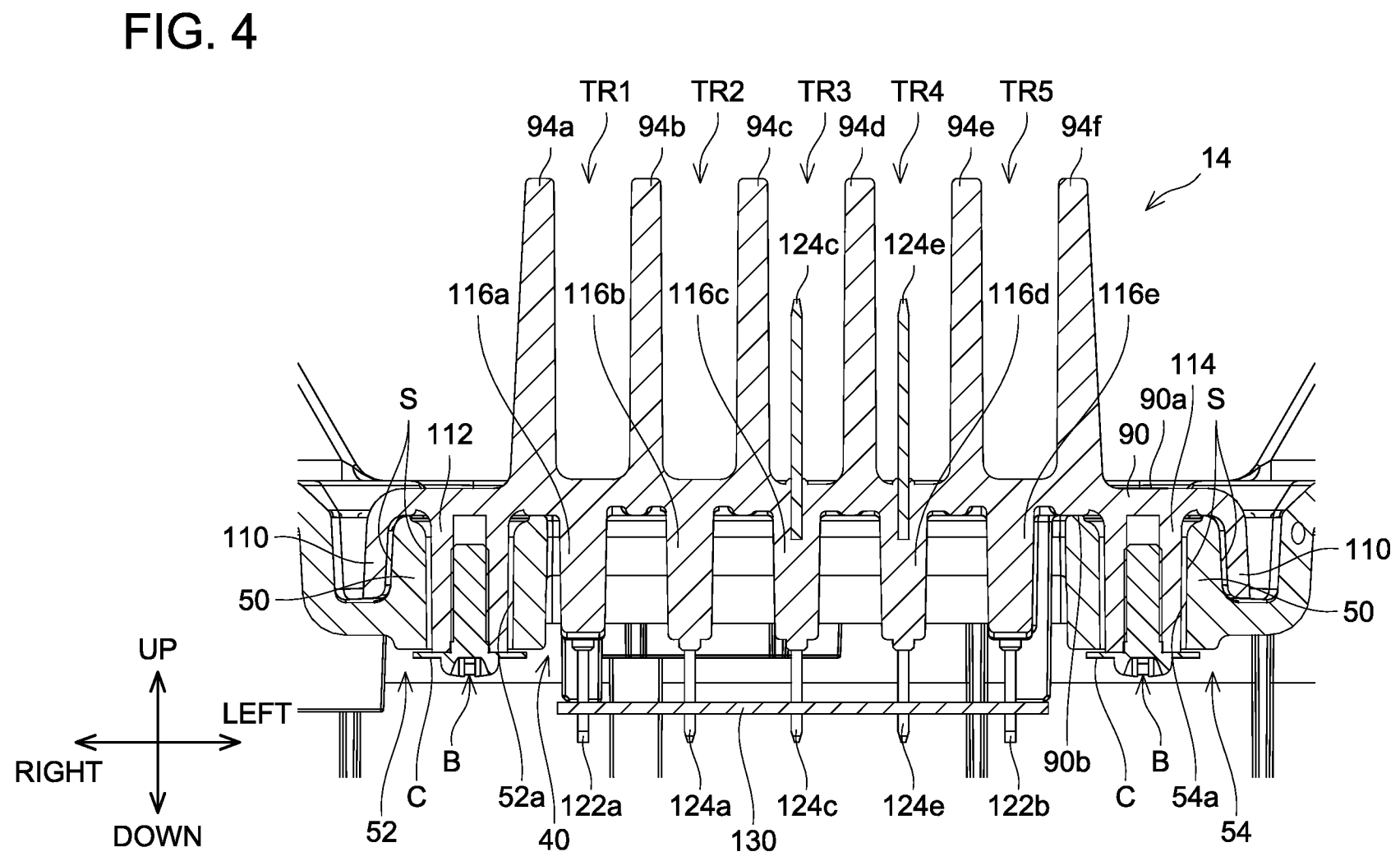
Figure 5:
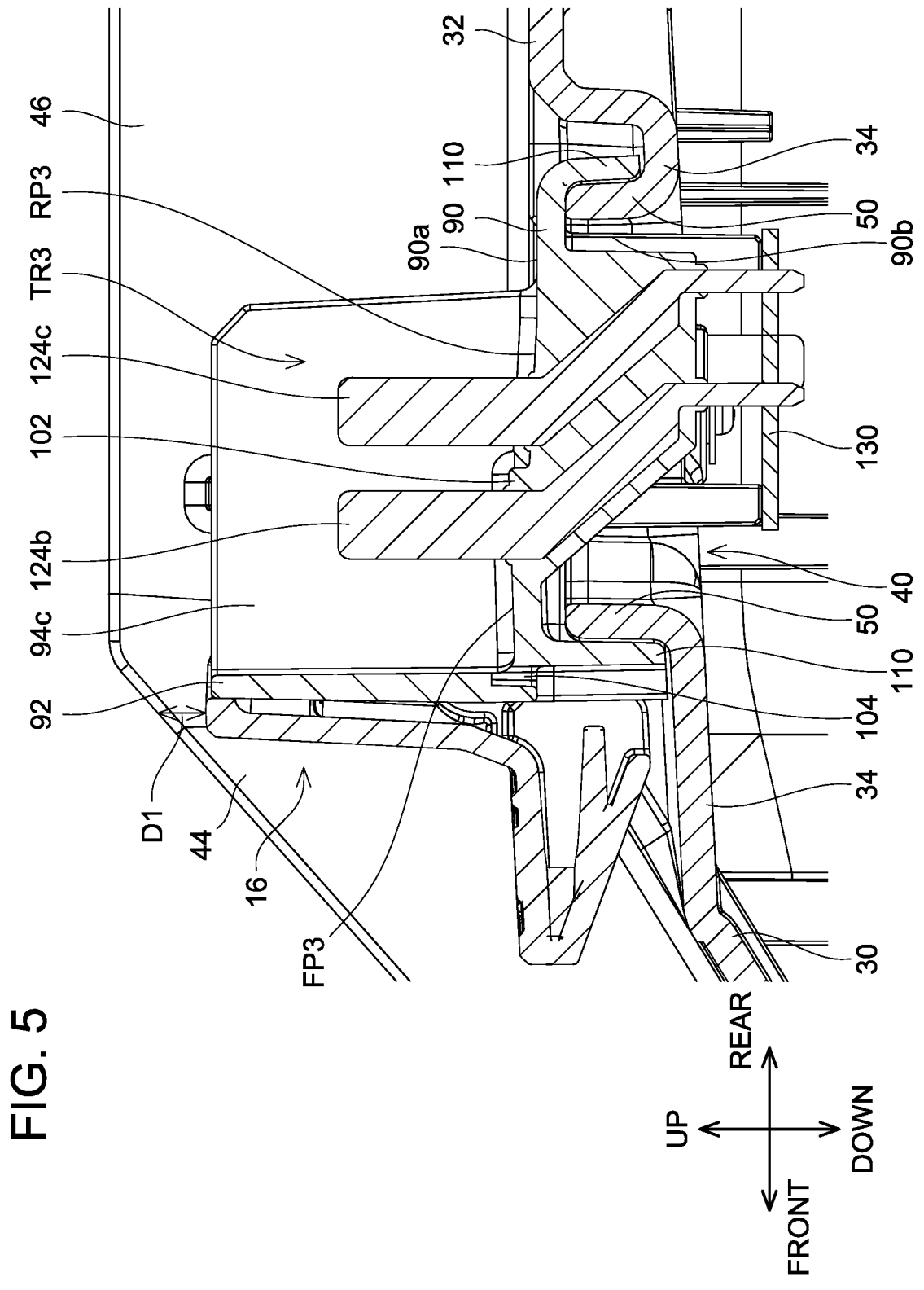
FIG. 5 is a cross-sectional view along a V-V line of FIG. 3.
Figure 7:
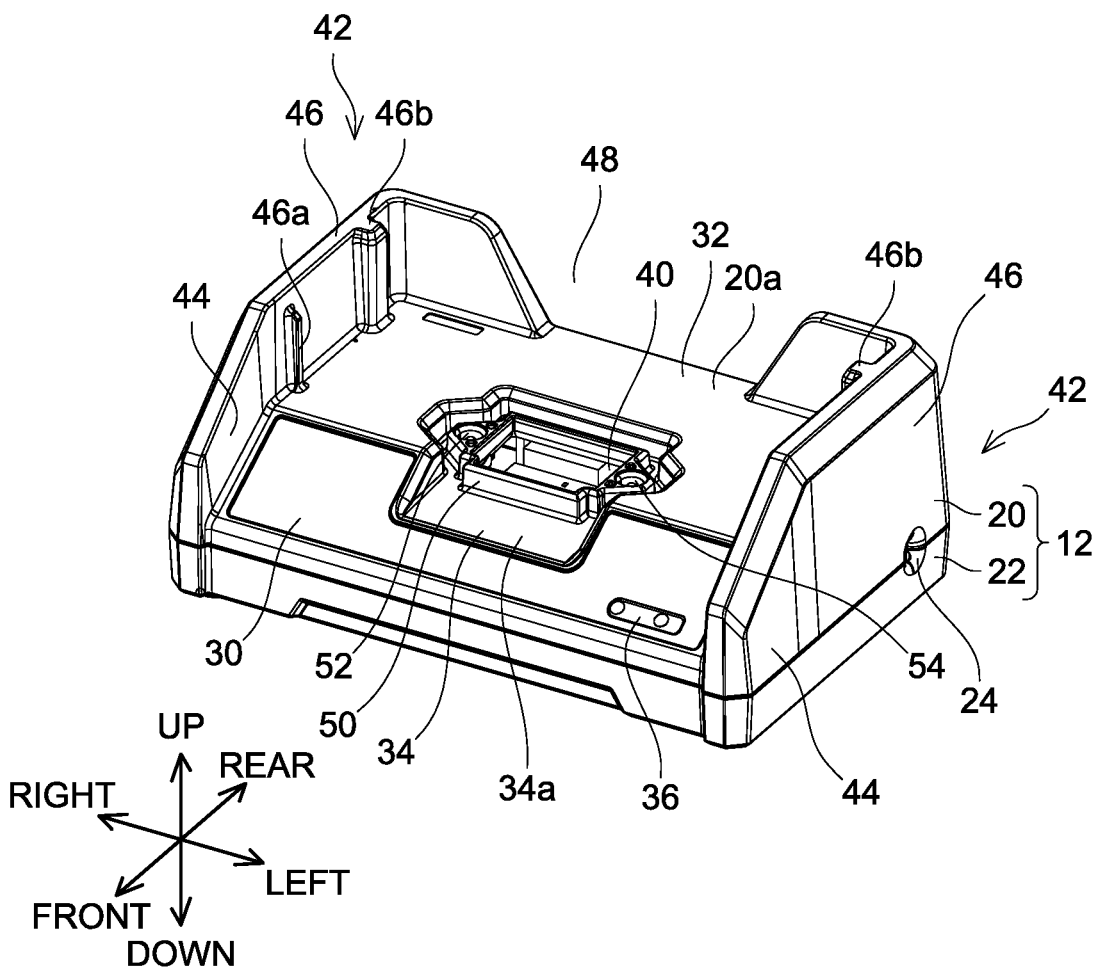
FIG. 7 is a perspective view of the charger 10 of the first embodiment with a terminal unit 14 detached, viewed from the left upper front side.

As illustrated in FIG. 7, an upper wall 20a of the upper case 20 is constituted of a front upper wall 30, a rear upper wall 32 and a center upper wall 34. The front upper wall 30 is disposed forward of the rear upper wall 32, and inclines such that its front side is inclined downward. A display 36 which shows a charge status of the battery pack 200 is disposed on the front upper wall 30. The center upper wall 34 is surrounded by the front upper wall 30 and the rear upper wall 32. The height of the center upper wall 34 is lower than the height of the rear upper wall 32. As illustrated in FIG. 5, the center upper wall 34 inclines such that its front side is inclined downward. An inclination angle of the center upper wall 34 is smaller than an inclination angle of the front upper wall 30. As illustrated in FIG. 7, an opening 40 is defined in the center upper wall 34. An upper rib 50 extending upward from an upper surface 34a of the center upper wall 34 is disposed around the opening 40. The upper rib 50 surrounds the entire periphery of the opening 40. Attachment portions 52, 54 are disposed on both sides of the upper rib 50. As illustrated in FIG. 4, the attachment portions 52, 54 include through holes 52a, 54a which penetrate the center upper wall 34 and the upper rib 50 in the up-down direction. The attachment portions 52, 54 are used to attach the terminal unit 14 to the upper case 20. As illustrated in FIG. 2, the terminal unit 14 covers the opening 40 from above.

Figure 3:
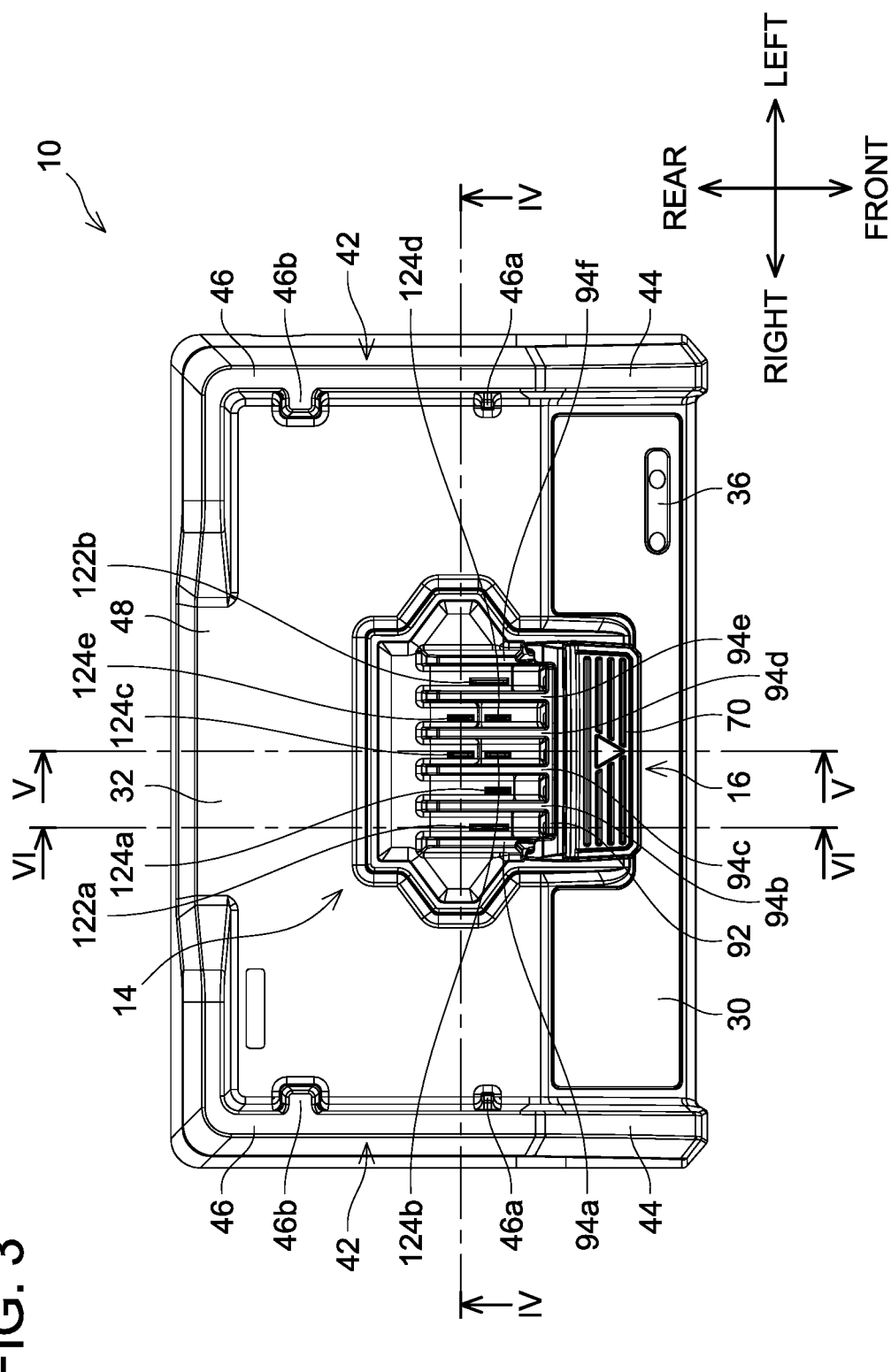
FIG. 3 is a top view of the charger 10 of the first embodiment viewed from above.

As illustrated in FIG. 2, the upper case 20 further includes standing portions 42. Each of the standing portions 42 includes a front standing portion 44 extending upward from the front upper wall 30 and a rear standing portion 46 extending upward from the rear upper wall 32. The front standing portions 44 are formed at the right and the left ends of the front upper wall 30. The upper ends of the front standing portions 44 incline such that their front sides are inclined downward. The rear standing portions 46 are formed at the right end, the left end and the rear end of the rear upper wall 32. A front rail 46a and a rear rail 46b protruding leftward are disposed on a right wall among the rear standing portions 46. As illustrated in FIG. 3, a front rail 46a and a rear rail 46b extending rightward are disposed on a left wall among the rear standing portions 46. The front rails 46a and the rear rails 46b extend in the up-down direction. The front rail 46a and the rear rail 46b disposed on the right wall have shapes corresponding to a first right guide groove 260 and second right guide groove 262 of the battery pack 200 (see FIG. 17) to be described later, respectively. The front rail 46a and the rear rail 46b disposed on the left wall have shapes corresponding to a first left guide groove 264 and second left guide groove 266 of the battery pack 200 (see FIG. 16) to be described later, respectively. A sliding direction of the battery pack 200 (the up-down direction in the present embodiment) is defined by the front rails 46a and the rear rails 46b. A recess 48 is defined between the left rear wall and the right rear wall of the opposite rear standing portions 46.

Figure 8:
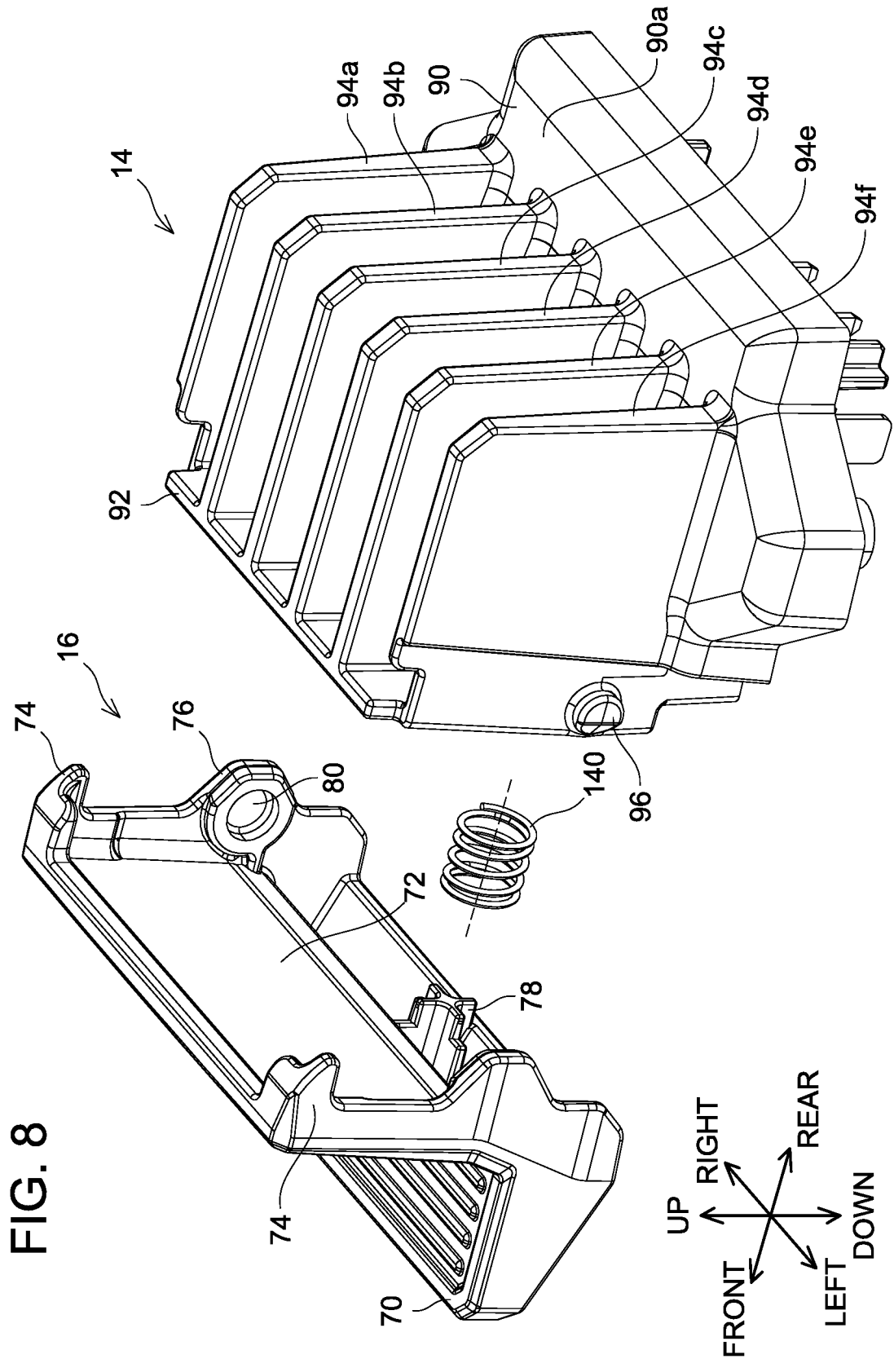
FIG. 8 is a disassembled view of the terminal unit 14 and a hook 16 of the first embodiment.

As illustrated in FIG. 8, the hook 16 includes an operation part 70, a rear wall 72 extending upward from the rear end of the operation part 70, engaging portions 74, connecting portions 76 and a rear protrusion 78. The operation part 70 is to be operated by a worker when the battery pack 200 is detached from the charger 10. The engaging portions 74 and the connecting portions 76 extend rearward from both the left and right ends of the rear wall 72. Upper surfaces of the engaging portions 74 incline such that their rear sides are inclined downward, and the lower surfaces of the engaging portions 74 are substantially parallel to a plane including the front-rear direction and the left-right direction. The engaging portions 74 are disposed at the upper end of the rear wall 72. The connecting portions 76 are located lower than the engaging portions 74. Recesses 80 having shapes corresponding to side protruding portions 96, 98 of the terminal unit 14 to be described later are defined in the connecting portions 76. The rear protrusion 78 extends rearward from the rear wall 72. The rear protrusion 78 is located lower than the connecting portions 76. A spring 140 is attached to the rear protrusion 78. As illustrated in FIG. 5, the upper end of the hook 16 is located lower than the upper ends of the front standing portions 44. In the present embodiment, under the state where the hook 16 is not operated by the worker, a distance D1 between the upper end of the hook 16 and each of the upper ends of the front standing portions 44 is 2 [mm].

Figure 9:
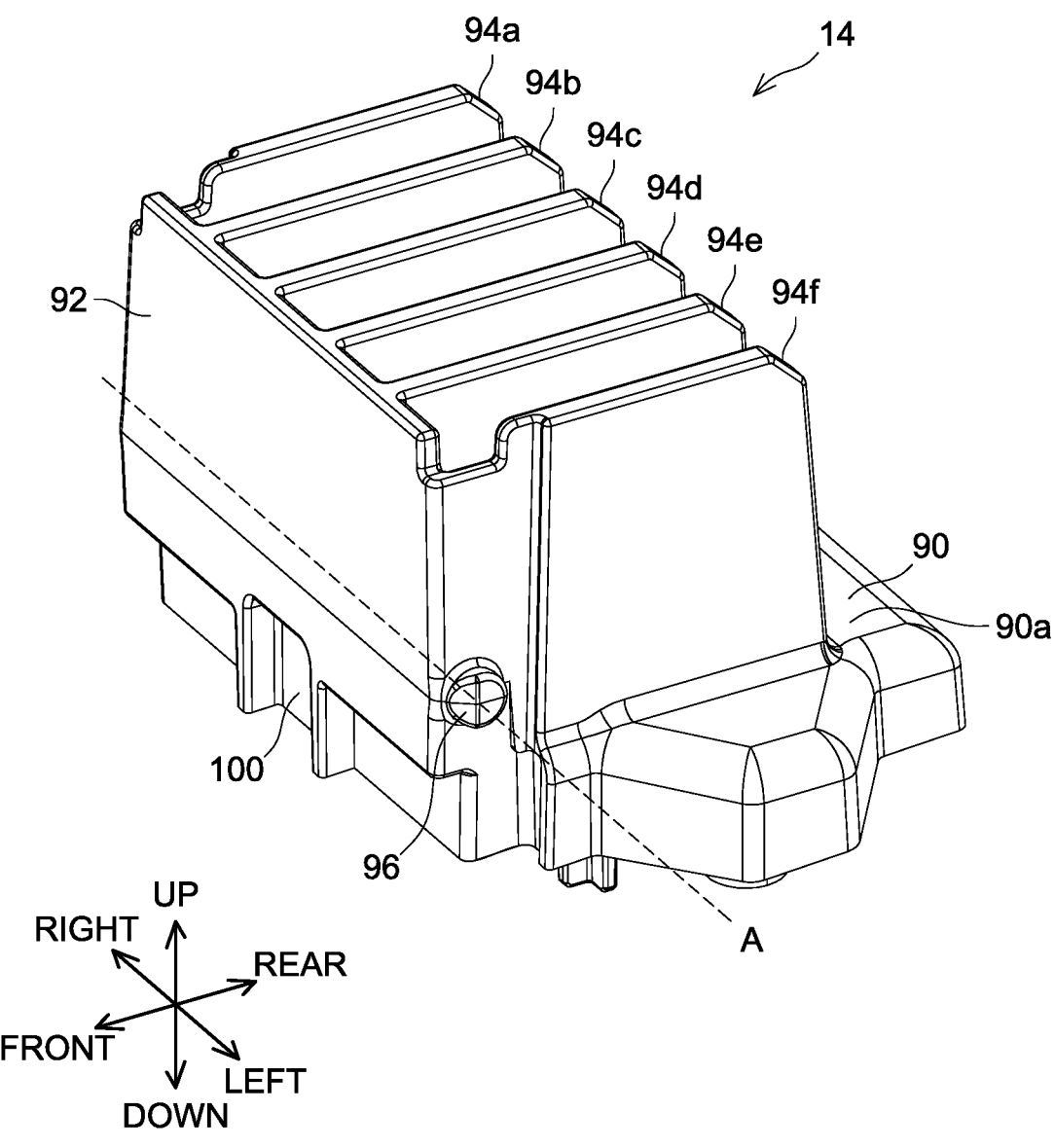
FIG. 9 is a perspective view of the terminal unit 14 of the first embodiment viewed from the left upper front side.
Figure 10:
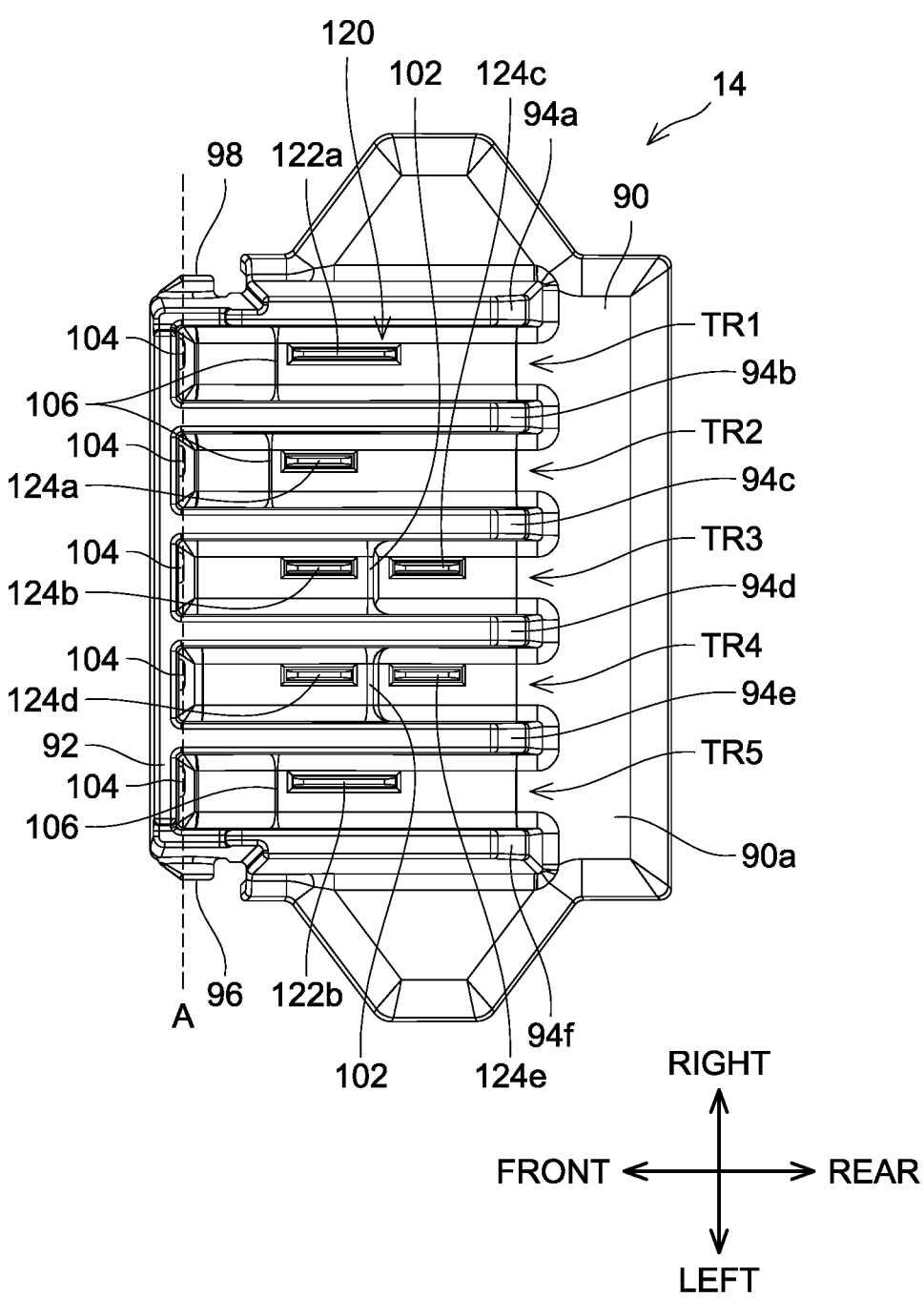
FIG. 10 is a top view of the terminal unit 14 of the first embodiment viewed from above.

As illustrated in FIG. 8 and FIG. 9, the terminal unit 14 includes a base 90, a front rib 92 extending upward from an upper surface 90a of the base 90 and side ribs 94a to 94f extending upward from the upper surface 90a. The side ribs 94a to 94f extend along a plane including the front-rear direction and the up-down direction. The side ribs 94a to 94f are disposed with spaces therebetween in the left-right direction. The front rib 92 extends along a plane including the left-right direction and the up-down direction and connects the front portions of the side ribs 94a to 94f. The side protruding portion 96 protruding leftward is disposed at a front lower portion of the side rib 94f disposed on the leftmost side. As illustrated in FIG. 10, the side protruding portion 98 protruding rightward is disposed at a front lower portion of the side rib 94a disposed on the rightmost side. When viewed in the left-right direction, the side protruding portions 96, 98 have circular shapes. The side protruding portions 96, 98 protrude along an axis A extending along the left-right direction. The hook 16 can be attached to the terminal unit 14 by inserting the side protruding portions 96, 98 to the recesses 80 in the hook 16. Under the state where the hook 16 is attached to the terminal unit 14, the hook 16 can rotate with the axis A of the side protruding portions 96, 98 as the rotation axis with respect to the terminal unit 14. As illustrated in FIG. 9, an indentation 100 is defined below the front rib 92. Under the state where the hook 16 is attached to the terminal unit 14, a part of the spring 140 is disposed in the indentation 100.

As illustrated in FIG. 10, a plurality of apparatus-side terminals 120 is attached to the base 90 of the terminal unit 14. The plurality of apparatus-side terminals 120 includes charging terminals 122a, 122b used for charging the battery pack 200 and signal terminals 124a to 124e used for sending and receiving a signal to and from the battery pack 200. The upper surface 90a of the base 90 is partitioned into five terminal regions TR1 to TR5 by the front rib 92 and side ribs 94a to 94f. The charging terminals 122a, 122b are disposed in the terminal regions TR1, TR5, respectively. The signal terminal 124a is disposed in the terminal region TR2. The signal terminals 124b, 124c are disposed in the terminal region TR3. The signal terminals 124d, 124e are disposed in the terminal region TR4. The charging terminals 122a, 122b are disposed outward of the signal terminals 124a to 124e in the left-right direction. The charging terminal 122a is disposed rightward of the signal terminals 124a to 124e, and the charging terminal 122b is disposed leftward of the signal terminals 124a to 124e. The signal terminals 124b, 124c are disposed side by side in the front-rear direction. The signal terminals 124d, 124e are disposed side by side in the front-rear direction. The signal terminal 124a is disposed between the charging terminal 122a and the signal terminal 124b in the left-right direction. Lower portions of the charging terminals 122a, 122b and lower portions of the signal terminals 124a to 124e are connected to a terminal substrate 130 (see FIG. 4 to FIG. 6) housed in the body case 12.

As illustrated in FIG. 5, in the terminal region TR3, a step portion 102 for changing a height of a front portion FP3 where the signal terminal 124b is disposed and a height of a rear portion RP3 where the signal terminal 124c is disposed is arranged between the signal terminal 124b and the signal terminal 124c. The front portion FP3 inclines such that its front portion is inclined downward, and the rear portion RP3 inclines such that its rear portion is inclined downward. In other words, the front portion FP3 inclines such that its signal terminal 124b side is located lower than its step portion 102 side, and the rear portion RP3 inclines such that its signal terminal 124c side is located lower than its step portion 102 side. A drain hole 104 for removing water that has reached the front portion FP3 of the terminal region TR3 is defined in a lower portion of the front rib 92 defining the terminal region TR3. The structure in the terminal region TR4 is the same as the structure in the terminal region TR3 except that the signal terminals 124d, 124e are disposed therein.

Figure 6:
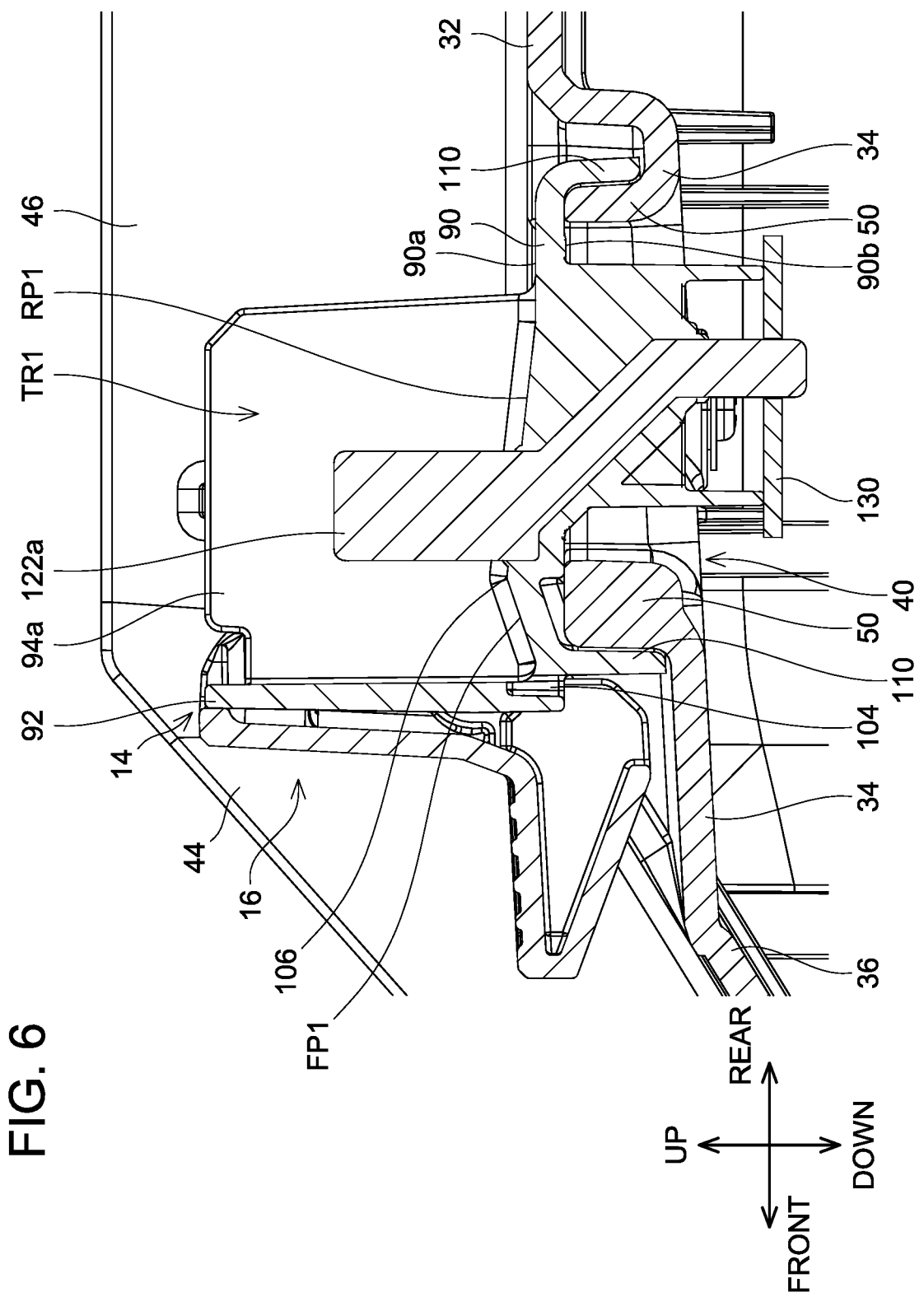
FIG. 6 is a cross-sectional view along a VI-VI line of FIG. 3.

As illustrated in FIG. 6, in the terminal region TR1, a boundary portion 106 is disposed between the charging terminal 122a and the front rib 92. In the terminal region TR1, a front portion FP1 located forward of the boundary portion 106 inclines such that its front side is inclined downward, and a rear portion RP1 located rearward of the boundary portion 106 inclines such that is rear portion is inclined downward. A drain hole 104 is defined in a lower portion of the front rib 92 defining the terminal region TR1. The insides of the terminal regions TR2, TR5 have similar shapes as a shape inside the terminal region TR1 except that the charging terminal 122b and the signal terminal 124a are disposed therein.

Figure 11:
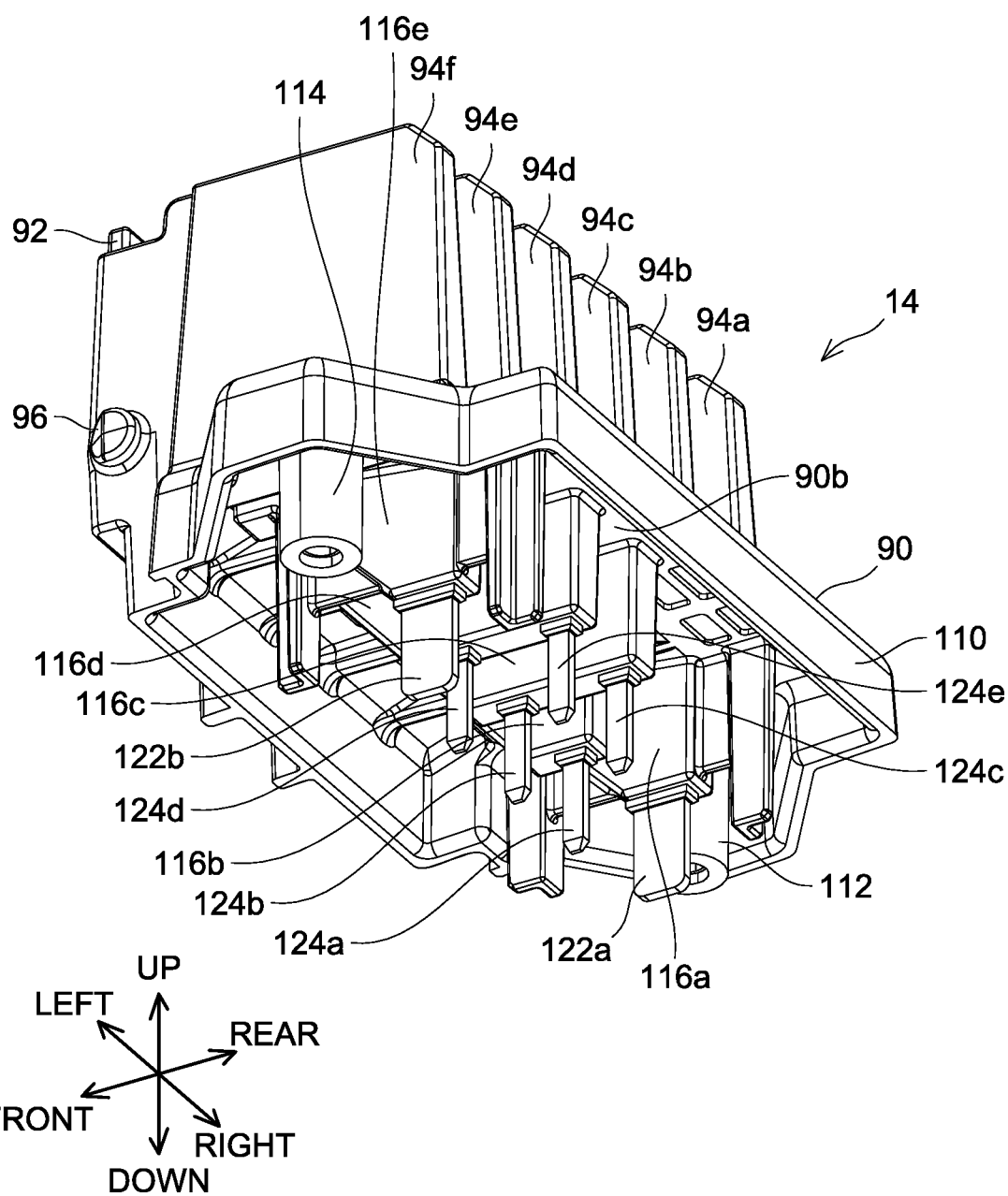
FIG. 11 is a perspective view of the terminal unit 14 of the first embodiment viewed from the left lower rear side.

As illustrated in FIG. 11, the terminal unit 14 further includes a lower rib 110, two boss portions 112, 114 and terminal fixing portions 116a to 116e. The lower rib 110 extends downward from a lower surface 90b of the base 90. An inner profile of the lower rib 110 has a shape corresponding to an outer profile of the upper rib 50 of the upper case 20 (see FIG. 7). As illustrated in FIG. 4 to FIG. 6, the lower rib 110 is disposed such that it is positioned outward of the upper rib 50 of the upper case 20. As illustrated in FIG. 5 and FIG. 6, the drain hole 104 is positioned closer to the front rib 92 than the lower rib 110 is. As illustrated in FIG. 11, the terminal fixing portions 116a to 116e extend downward from the lower surface 90b of the base 90. The charging terminal 122a is fixed to the terminal fixing portion 116a, the signal terminal 124a is fixed to the terminal fixing portion 116b, the signal terminals 124b, 124c are fixed to the terminal fixing portion 116c, the signal terminals 124d, 124e are fixed to the terminal fixing portion 116d and the charging terminal 122b is fixed to the terminal fixing portion 116e. The boss portions 112, 114 extend downward from the lower surface 90b. The boss portions 112, 114 are disposed at positions corresponding to attachment portions 52, 54 of the upper case 20, respectively. As illustrated in FIG. 4, an outer diameter of each of the boss portions 112, 114 is smaller than a diameter of each of the through holes 52a, 54a of the attachment portions 52, 54. In the present embodiment, a screw B having a flange C having an outer diameter greater than the diameter of each of the through holes 52a, 54a is screwed into each of the boss portions 112, 114. Each of the attachment portions 52, 54 of the body case 12 is clamped between the flange C of the screw B and the lower surface 90b of the base 90 of the terminal unit 14, by which the terminal unit 14 is attached to the body case 12. Under the state where the terminal unit 14 is attached to the body case 12, it can be said that the base 90 of the terminal unit 14 is a part of the upper wall 20a of the body case 12. Under the state where the terminal unit 14 is attached to the body case 12, spaces S are provided between the boss portions 112, 114 and the attachment portions 52, 54 in the left-right direction. Spaces S are also provided between the lower rib 110 of the terminal unit 14 and the upper rib 50 of the upper case 20 in the left-right direction. In other words, the terminal unit 14 can slightly move in the horizontal direction relative to the body case 12. In a variant, the screw B may not include a flange. In the present variant, a washer having an outer diameter greater than each of the through holes 52a, 54a may be used.

(Configuration of Battery Pack 200)

Figure 16:
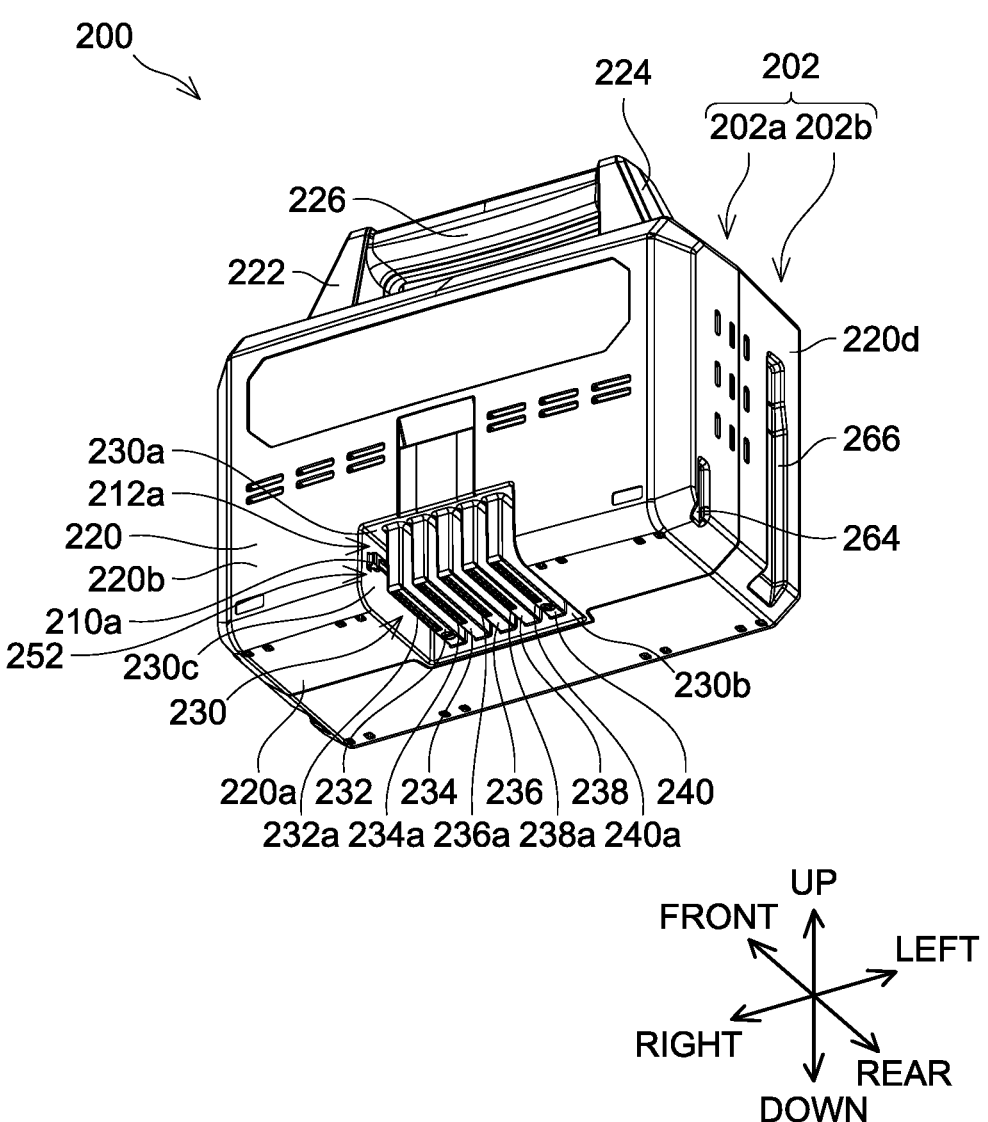
FIG. 16 is a perspective view of a battery pack 200 of the first embodiment viewed from the left lower front side.
Figure 17:
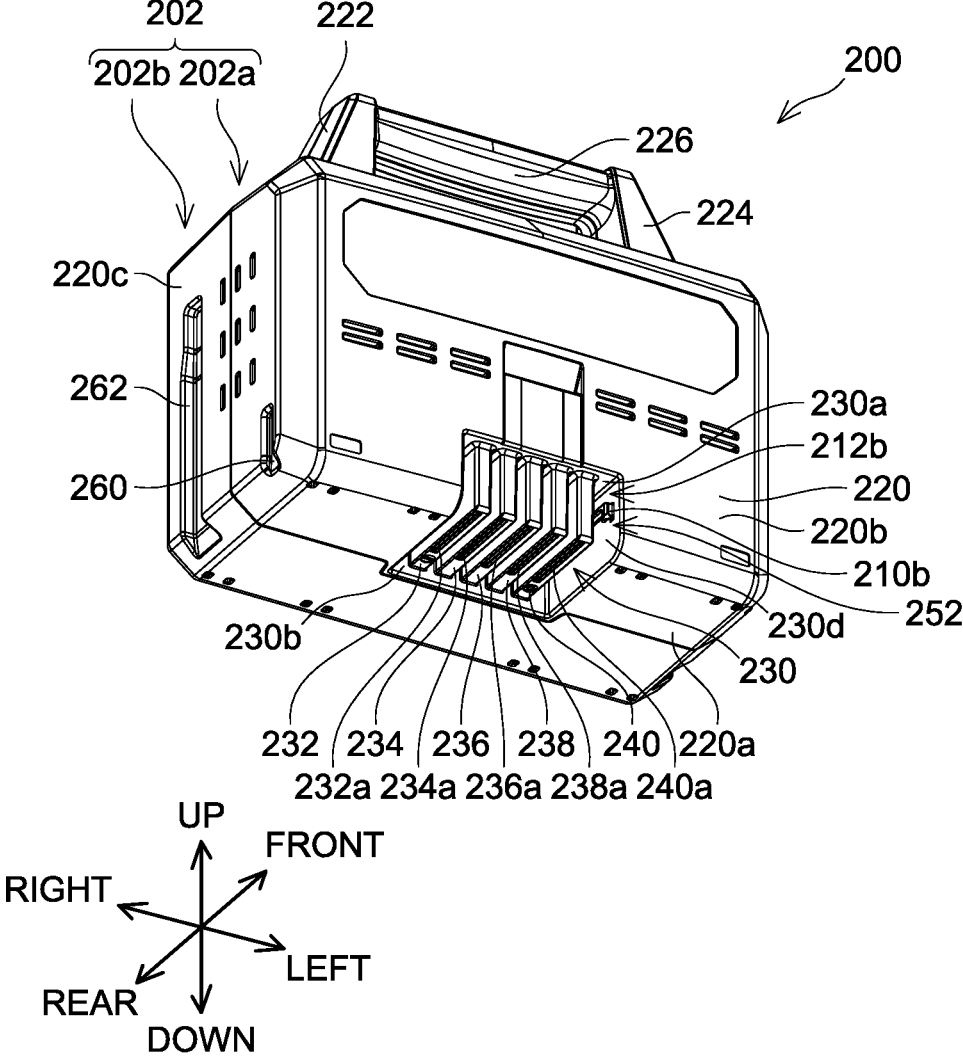
FIG. 17 is a perspective view of the battery pack 200 of the first embodiment viewed from the right lower front side.

With reference to FIG. 16 to FIG. 24, the battery pack 200 will be described. As illustrated in FIG. 16 and FIG. 17, the battery pack 200 includes a housing 202. The housing 202 is constituted of a front housing 202a and a rear housing 202b. The housing 202 includes a body portion 220, a right support portion 222, a left support portion 224 and a grip 226. The body portion 220 has a substantially cuboid shape. The right support portion 222 protrudes upward from the vicinity of the right end of the upper surface of the body portion 220. The left support portion 224 protrudes upward from the vicinity of the left end of the upper surface of the body portion 220. The grip 226 extends in the left-right direction and connects the vicinity of the upper end of the left surface of the right support portion 222 and the vicinity of the upper end of the right surface of the left support portion 224. A weight of the battery pack 200 is for example within a range from 1.0 kg to 4.0 kg, and more specifically, 2.2 kg. A rated voltage of the battery pack 200 is for example within a range from 36 V to 108 V, and more specifically, 57.6 V. A rated capacity of the battery pack 200 is for example within a range from 3.0 Ah to 12.0 Ah, and more specifically, 4.0 Ah.

A terminal interface (hereafter may be referred to as "IF") portion 230 is formed at a front lower portion of the body portion 220 in the vicinity of the center of the body portion 220 in the left-right direction. The terminal IF portion 230 has a recessed shape in which a front portion and a lower portion of the terminal IF portion 230 are open. The terminal IF portion 230 includes an IF upper surface 230a, an IF rear surface 230b, an IF right surface 230c and an IF left surface 230d (see FIG. 17). The IF upper surface 230a is along the front-rear direction and the left-right direction, faces downward, and is offset upward from the lower surface 220a of the body portion 220. The IF rear surface 230b is along the up-down direction and the left-right direction, faces frontward and is offset rearward from the front surface 220b of the body portion 220. The IF right surface 230c is along the front-rear direction and up-down direction and faces leftward. The IF left surface 230d (see FIG. 17) is along the front-rear direction and the up-down direction and faces rightward. The terminal IF portion 230 includes a plurality of terminal housing portions 232 to 240 disposed side-by-side in the left-right direction between the IF right surface 230c and the IF left surface 230d. The terminal housing portions 232 to 240 extend forward from the IF rear surface 230b of the terminal IF portion 230, and extend downward from the IF upper surface 230a of the terminal IF portion 230. Lower surfaces of the terminal housing portions 232 to 240 are disposed higher than the lower surface 220a of the body portion 220 and are substantially coplanar. Front surfaces of the terminal housing portions 232 to 240 are disposed rearward of the front surface 220b of the body portion 220 and are substantially coplanar. Terminal openings 232a to 240a are defined in the lower surfaces of the terminal housing portions 232 to 240. Each of the terminal openings 232a to 240a is a slit-like through hole having its longitudinal direction along the front-rear direction.

Figure 18:
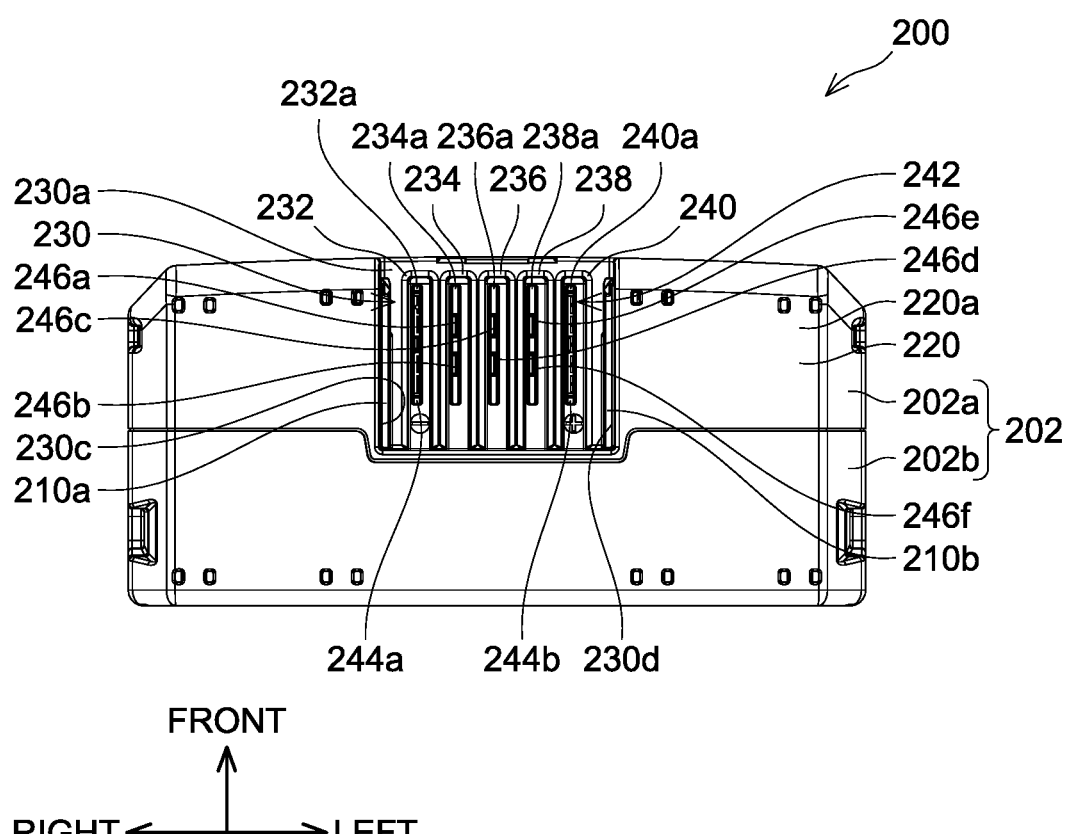
FIG. 18 is a bottom view of the battery pack 200 of the first embodiment viewed from below.
Figure 18:
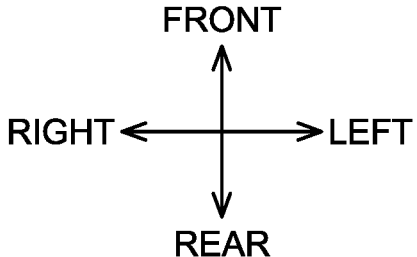
Figure 20:
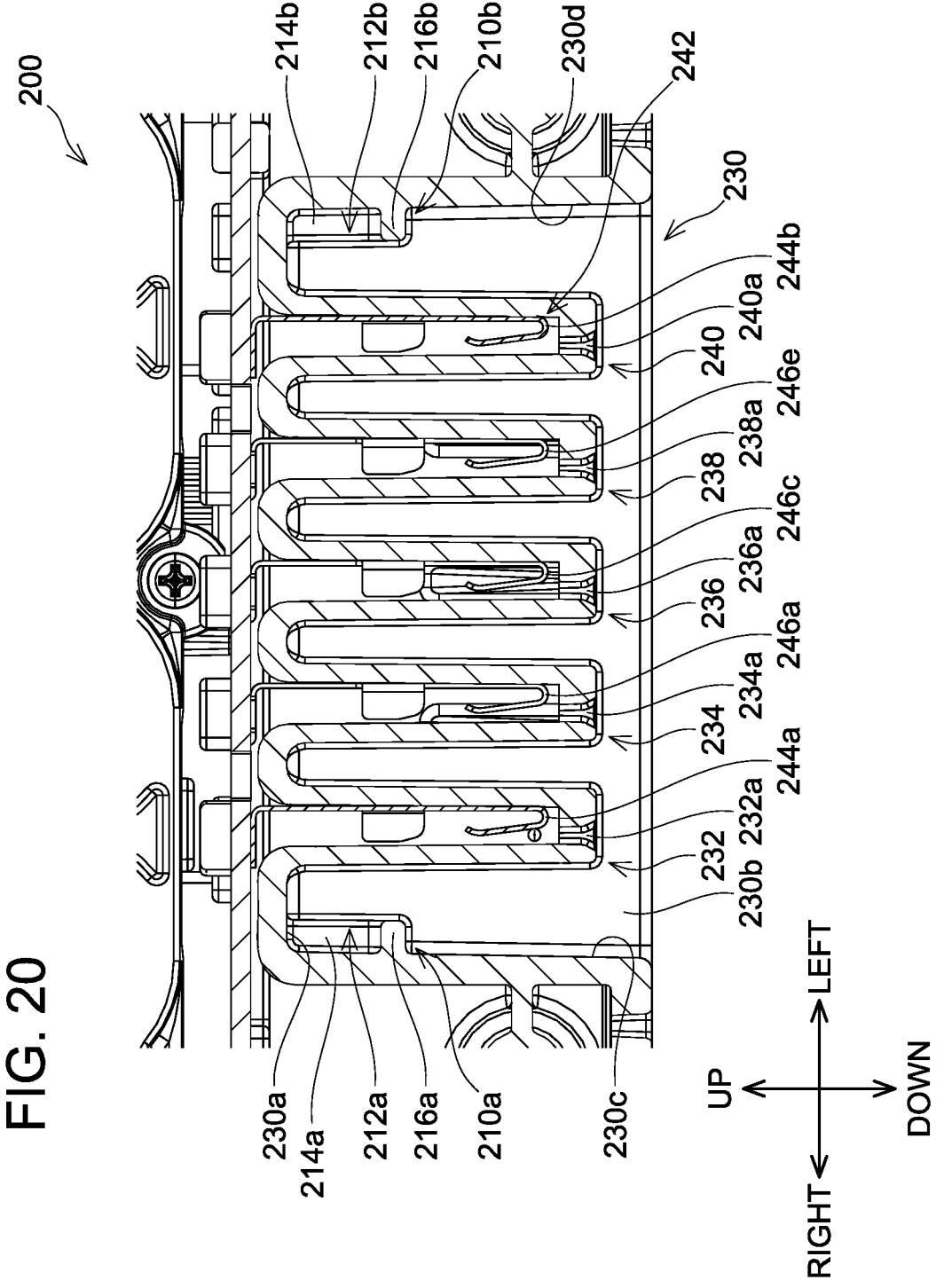
FIG. 20 is a front cross-sectional view of the battery pack 200 of the first embodiment.

As illustrated in FIG. 18 and FIG. 20, a plurality of battery-side terminals 242 is housed in the terminal housing portions 232 to 240. As illustrated in FIG. 18, the plurality of battery-side terminals 242 includes battery-side power terminals 244a, 244b and battery-side signal terminals 246a to 246f. The battery-side power terminal 244a is housed in the rightmost terminal housing portion 232. The battery-side power terminal 244b is housed in the leftmost terminal housing portion 240. The battery-side signal terminals 246a, 246b are housed in the terminal housing portion 234 leftward of the rightmost terminal housing portion 232. The battery-side signal terminals 246a, 246b are disposed side-by-side in the front-rear direction. The battery-side signal terminals 246c, 246d are housed in the center terminal housing portion 236. The battery-side signal terminals 246c, 246d are arranged side by side in the front-rear direction. The battery-side signal terminals 246e, 246f are housed in the terminal housing portion 238 rightward of the leftmost terminal housing portion 240. The battery-side signal terminals 246e, 246f are arranged side by side in the front-rear direction. The battery-side power terminals 244a, 244b are terminals corresponding to the charging terminals 122a, 122b (see FIG. 3) of the charger 10, respectively. The battery-side power terminals 244a, 244b are used for charging under the state where the battery pack 200 is attached to the charger 10. The battery-side signal terminals 246a, 246c to 246f are terminals corresponding to the signal terminals 124a, 124b to 124e (see FIG. 3) of the charger 10, respectively. The battery-side signal terminals 246a, 246c to 246f are used to send and receive a signal to and from the charger 10 under the state where the battery pack 200 is attached to the charger 10. When the battery pack 200 is attached to a working machine such as a lawnmower, the battery-side power terminals 244a, 244b are connected to apparatus-side power terminals of the working machine and used to discharge. When the battery pack 200 is attached to a working machine such as a lawnmower, each of the battery-side signal terminals 246b to 246f is connected to an apparatus-side signal terminal of the working machine and used to send and receive a signal to and from the working machine.

Figure 19:
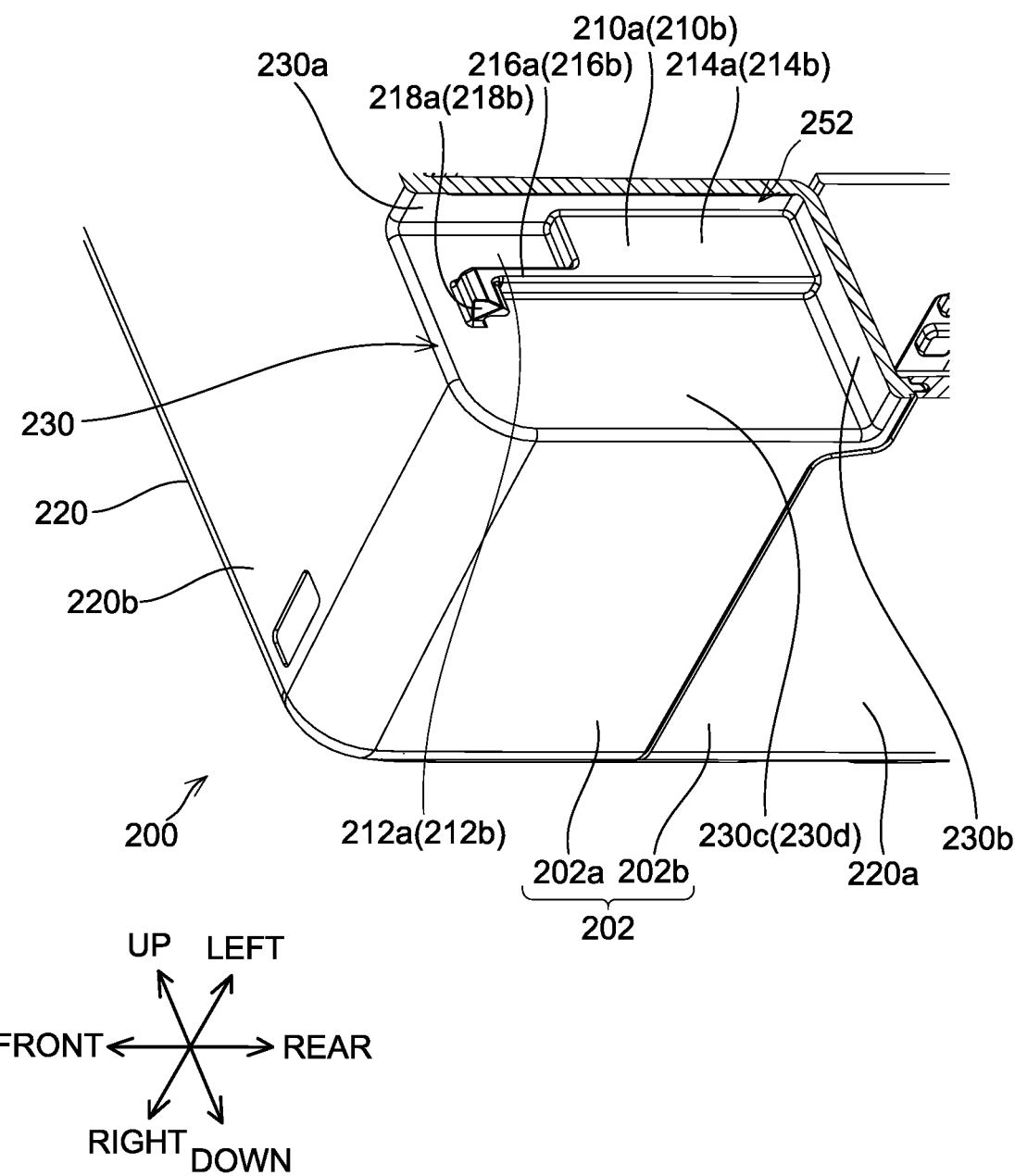
FIG. 19 is a perspective cross-sectional view of a right engaging portion 210a of the battery pack 200 of the first embodiment and its vicinity viewed from the left front lower side.

As illustrated in FIG. 16, a right engaging portion 210a protruding leftward is formed on the IF right surface 230c of the terminal IF portion 230. As illustrated in FIG. 18, a left engaging portion 210b protruding rightward is disposed on the IF left surface 230d of the terminal IF portion 230. The right engaging portion 210a and the left engaging portion 210b are at positions and have shapes symmetrical to each other in the left-right direction. As illustrated in FIG. 19, the right engaging portion 210a includes a right base 214a whose upper end is connected to the IF upper surface 230a and rear end is connected to the IF rear surface 230b, a right extending portion 216a extending forward from a lower portion of the front end of the right base 214a and a right tip end 218a extending downward from the front end of the right extending portion 216a. A right groove 212a extending in the front-rear direction is defined by the IF upper surface 230a, the right base 214a and the right extending portion 216a. Similarly, the left engaging portion 210b includes a left base 214b whose upper end is connected to the IF upper surface 230a and rear end is connected to the IF rear surface 230b, a left extending portion 216b extending frontward from a lower portion of the front end of the left base 214b and a left tip end 218b extending downward from the front end of the left extending portion 216b. A left groove 212b extending in the front-rear direction is defined by the IF upper surface 230a, the left base 214b and the left extending portion 216b.

As illustrated in FIG. 20, the right groove 212a and the left groove 212b are defined in the vicinity of the plurality of battery-side terminals 242. The engaging portions 74 of the hook 16 of the charger 10 (see FIG. 8) are to be engaged with the right groove 212a and the left groove 212b.

Figure 21:
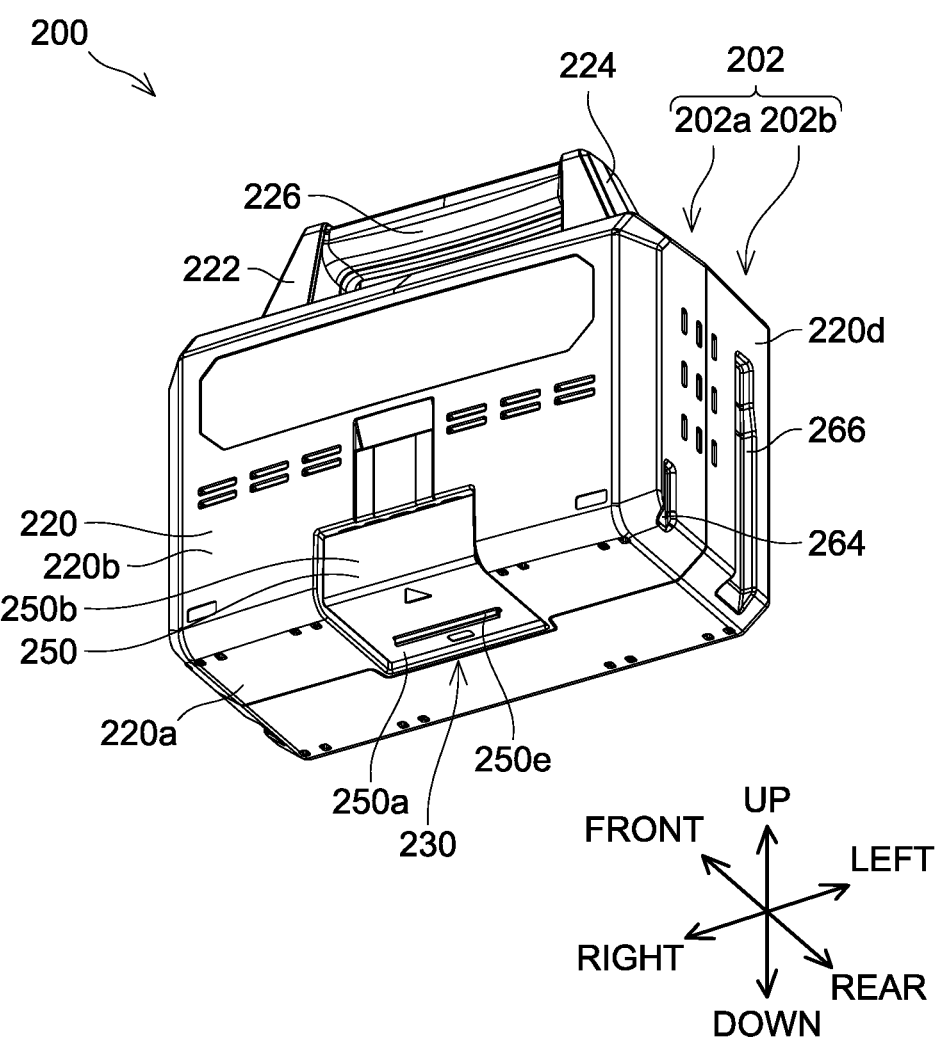
FIG. 21 is a perspective view of the battery pack 200 with a terminal cover 250 attached in the first embodiment, viewed from the left lower front side.

As illustrated in FIG. 21, the terminal cover 250 can detachably be attached to the terminal IF portion 230. The terminal cover 250 can be attached to the terminal IF portion 230 by sliding the terminal cover 250 rearward with respect to the terminal IF portion 230. The terminal cover 250 can be detached from the terminal IF portion 230 by sliding the terminal cover 250 frontward with respect to the terminal IF portion 230.

Figure 22:
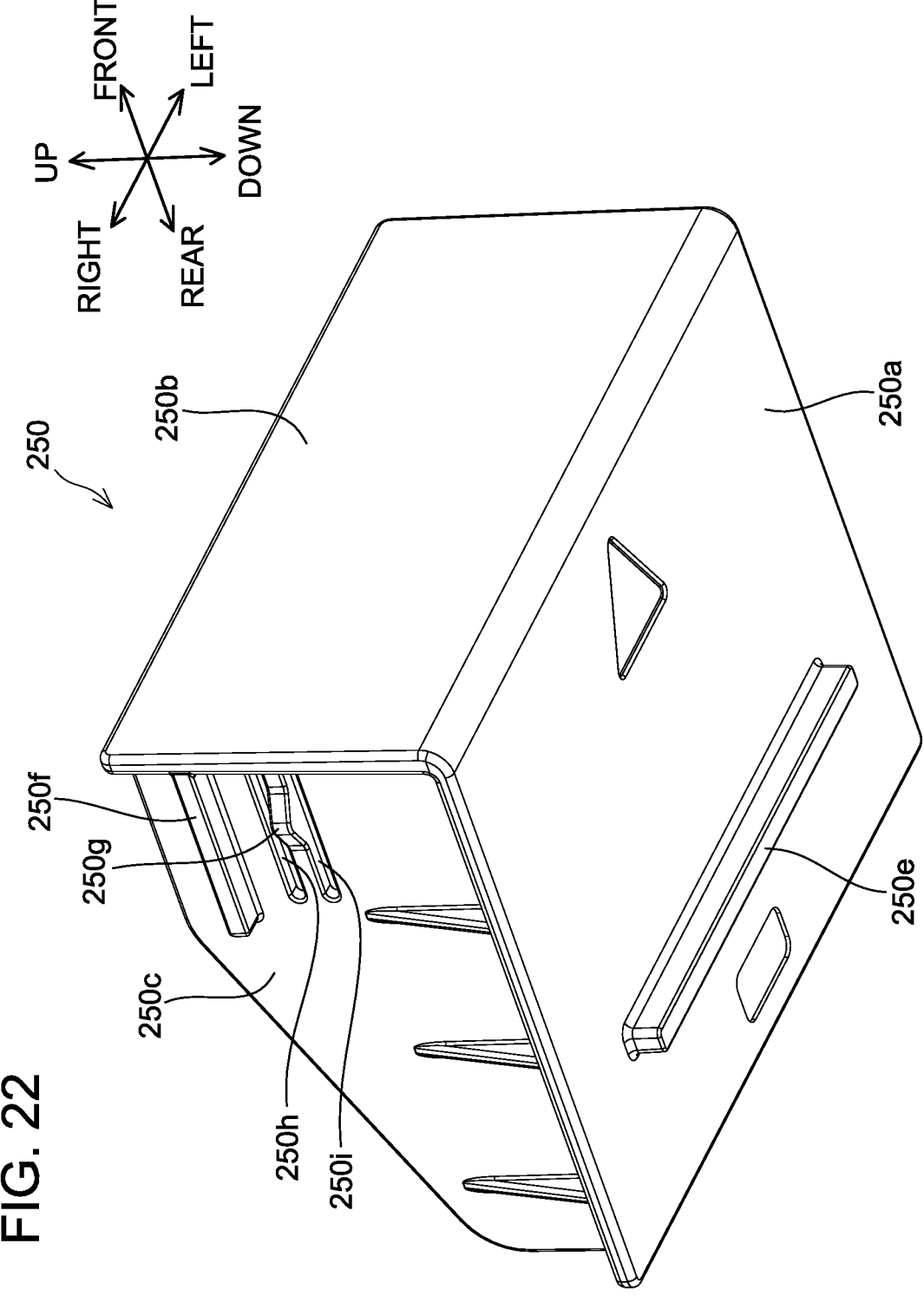
FIG. 22 is a perspective view of the terminal cover 250 of the battery pack 200 of the first embodiment viewed from the right front lower side.
Figure 23:
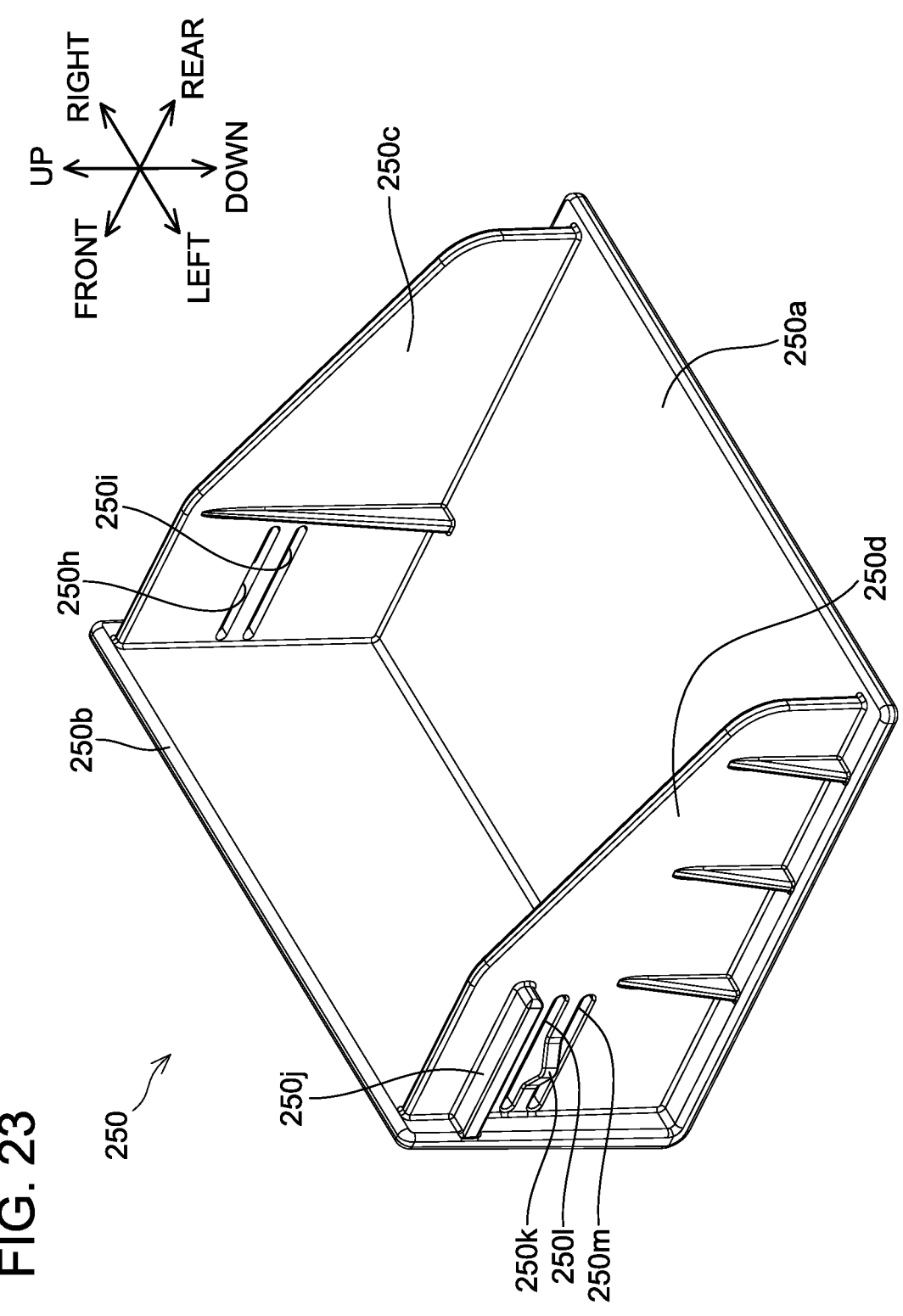
FIG. 23 is a perspective view of the terminal cover 250 of the battery pack 200 of the first embodiment viewed from the left rear upper side.

As illustrated in FIG. 22, the terminal cover 250 includes a lower plate portion 250a, a front plate portion 250b, a right plate portion 250c and a left plate portion 250d (see FIG. 23). The terminal cover 250 is a member constituted of resin, and the lower plate portion 250a, the front plate portion 250b, the right plate portion 250c and the left plate portion 250d are integrally formed. The lower plate portion 250a has a substantially flat-plate shape along the front-rear direction and the left-right direction. The lower plate portion 250a has a substantially rectangular shape which has its longitudinal direction along the left-right direction and its short direction along the front-rear direction. A finger-placement protrusion 250e protruding downward and extending in the left-right direction is formed on the lower surface of the lower plate portion 250a. The finger-placement protrusion 250e is disposed rearward of the center of the lower plate portion 250a in the front-rear direction. The front plate portion 250b extends upward from the front end of the lower plate portion 250a. The front plate portion 250b has a flat-plate shape along the up-down direction and the left-right direction. The front plate portion 250b has a substantially rectangular shape which has its longitudinal direction along the left-right direction and its short direction along the up-down direction.

A right rail 250*f* protruding rightward and a right engaging protrusion 250*g* protruding rightward are further disposed on the right surface of the right plate portion 250*c*. The right rail 250*f* extends in the front-rear direction. An upper slit 250*h* extending in the front-rear direction above the right engaging protrusion 250*g* and a lower slit 250*i* extending in the front-rear direction below the right engaging protrusion 250*g* are defined in the right plate portion 250*c*. Similarly, as illustrated in FIG. 23, a left rail 250*j* protruding leftward and a left engaging protrusion 250*k* protruding leftward are further disposed on the left surface of the left plate portion 250*d*. The left rail 250*j* extends along the front-rear direction. An upper slit 250*l* extending in the front-rear direction above the left engaging protrusion 250*k* and a lower slit 250*m* extending in the front-rear direction below the left engaging protrusion 250*k* are defined in the left plate portion 250*d*.

Figure 24:
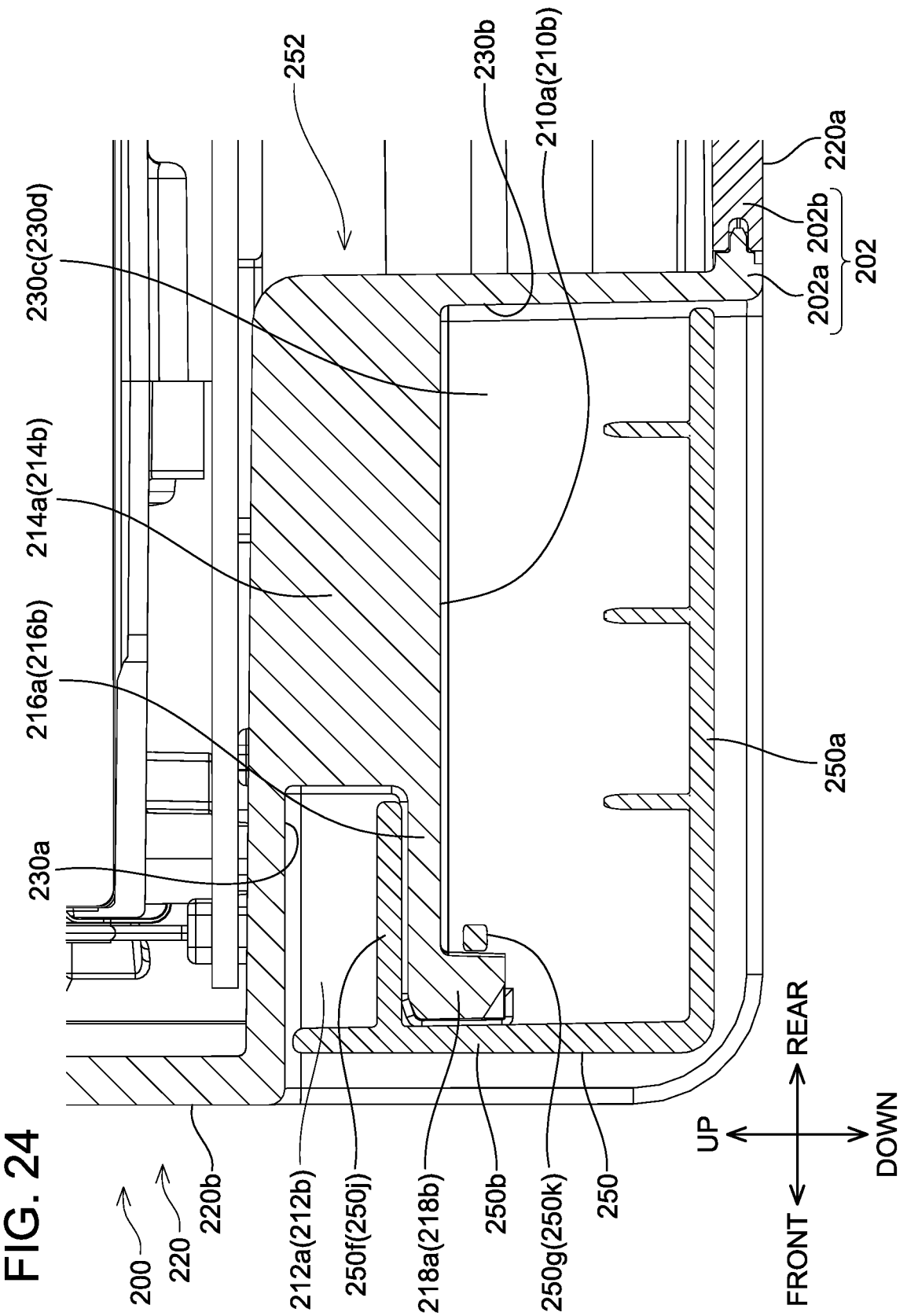
FIG. 24 is a right cross-sectional view of the battery pack 200 with the terminal cover 250 attached in the first embodiment.
Figure 25:
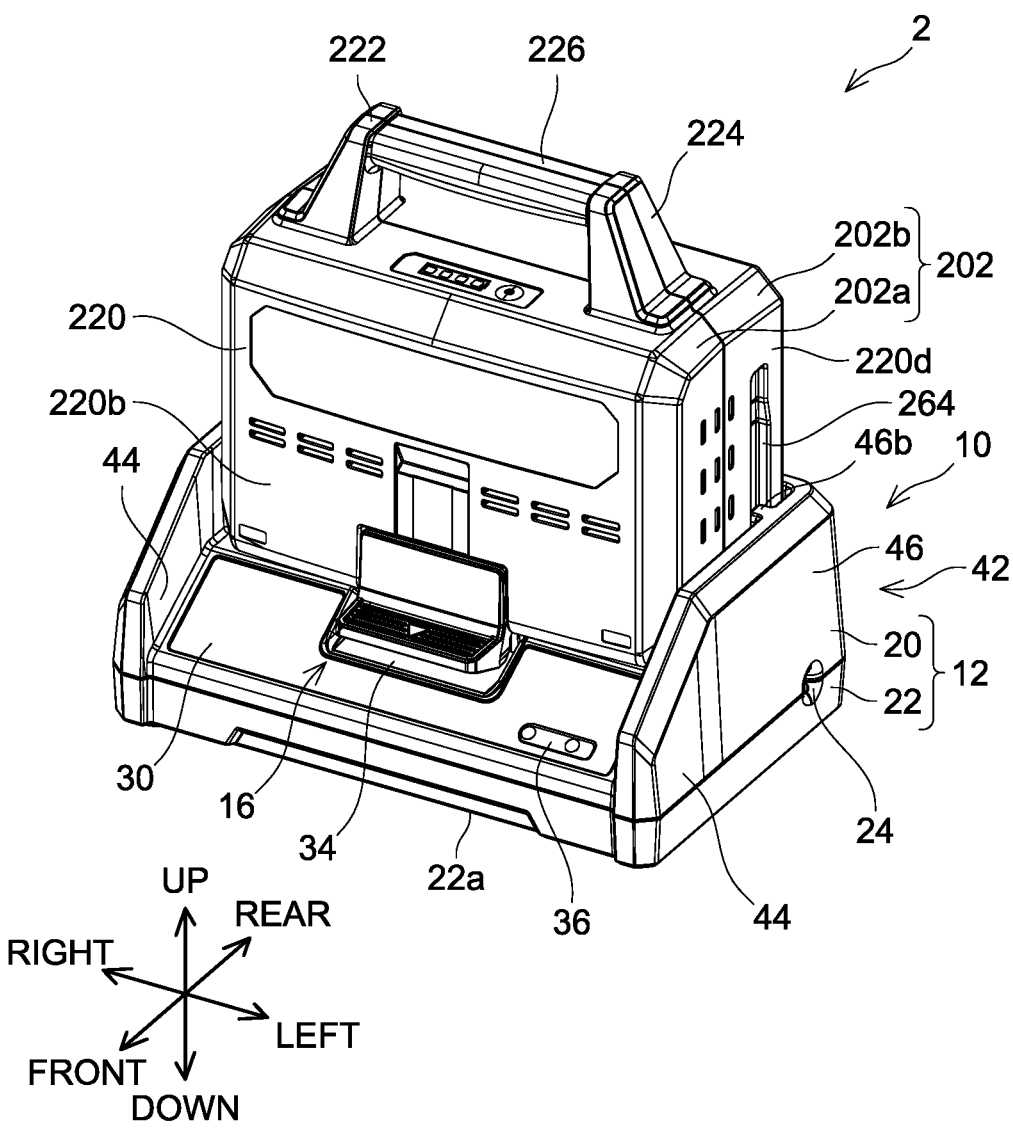
FIG. 25 is a perspective view of the state in which the battery pack 200 of the first embodiment is attached to the charger 10 viewed from the left upper front side.

As illustrated in FIG. 24, when the terminal cover 250 is to be attached to the terminal IF portion 230, the lower surface of the right rail 250*f* of the terminal cover 250 slides with respect to the upper surface of the right extending portion 216*a* of the right engaging portion 210*a*, and the lower surface of the left rail 250*j* of the terminal cover 250 slides with respect to the upper surface of the left extending portion 216*b* of the left engaging portion 210*b*. When the right engaging protrusion 250*g* of the terminal cover 250 comes into contact with the right tip end 218*a* of the right engaging portion 210*a*, the right engaging protrusion 250*g* elastically deforms leftward, and when the left engaging protrusion 250*k* of the terminal cover 250 comes into contact with the left tip end 218*b* of the left engaging portion 210*b*, the left engaging protrusion 250*k* elastically deforms rightward. Then, when the right engaging protrusion 250*g* moves rearward beyond the right tip end 218*a* of the right engaging portion 210*a*, the elastic deformation of the right engaging protrusion 250*g* is released and the right engaging protrusion 250*g* engages with the right tip end 218*a* of the right engaging portion 210*a*, and when the left engaging protrusion 250*k* moves rearward beyond the left tip end 218*b* of the left engaging portion 210*b*, the elastic deformation of the left engaging protrusion 250*k* is released and the left engaging protrusion 250*k* engages with the left tip end 218*b* of the left engaging portion 210*b*. Consequently, the terminal cover 250 is fixed to the terminal IF portion 230. Hereafter, the right engaging portion 210*a*, the right groove 212*a*, the right base 214*a*, the right extending portion 216*a*, the left engaging portion 210*b*, the left groove 212*b*, the left base 214*b* and the left extending portion 216*b* may collectively be referred to "cover attachment portion 252".

As illustrated in FIG. 21, under the state where the terminal cover 250 is attached to the terminal IF portion 230 (specifically, the cover attachment portion 252), the lower surfaces of the terminal housing portions 232 to 240 (see FIG. 16) and the terminal openings 232*a* to 240*a* of the terminal housing portions 232 to 240 (see FIG. 16) are covered by the lower plate portion 250*a* of the terminal cover 250. Under the state where the terminal cover 250 is attached to the terminal IF portion 230, the front surfaces of the terminal housing portions 232 to 240 (see FIG. 16) are covered by the front plate portion 250*b* of the terminal cover 250.

When the terminal cover 250 is to be detached from the terminal IF portion 230, a user places his/her finger on the finger-placement protrusion 250*e* and slides the terminal cover 250 frontward with respect to the terminal IF portion 230. Consequently, the engagement between the right engaging protrusion 250*g* of the terminal cover 250 (see FIG. 24) and the right tip end 218*a* of the right engaging portion 210*a* is released and the engagement between the left engaging protrusion 250*k* of the terminal cover 250 (see FIG. 24) and the left tip end 218*b* of the left engaging portion 210*b* is released, by which the terminal cover 250 is detached from the terminal IF portion 230.

As illustrated in FIG. 17, a first right guide groove 260 extending in the up-down direction and a second right guide groove 262 extending in the up-down direction are defined in the right surface 220*c* of the body portion 220. The first right guide groove 260 is arranged close to the front end of the right surface 220*c* between the center of the right surface 220*c* in the front rear direction and the front end of the right surface 220*c*, and the second right guide groove 262 is arranged close to the rear end of the right surface 220*c* between the center of the right surface 220*c* in the front-rear direction and the rear end of the right surface 220*c*. The first right guide groove 260 and the second right guide groove 262 are defined at positions corresponding to the front rail 46*a* and rear rail 46*b* on the right side of the charger 10 (see FIG. 3), respectively. As illustrated in FIG. 16, a first left guide groove 264 extending in the up-down direction and a second left guide groove 266 extending in the up-down direction are defined in the left surface 220*d* of the body portion 220. The first left guide groove 264 is arranged close to the front end of the left surface 220*d* between the center of the left surface 220*d* in the front-rear direction and the front end of the left surface 220*d*, and the second left guide groove 266 is arranged close to the rear end of the left surface 220*d* between the center of the left surface 220*d* in the front-rear direction and the rear end of the left surface 220*d*. The first left guide groove 264 and the second left guide groove 266 are defined at positions corresponding to the front rail 46*a* and the rear rail 46*b* on the left side of the charger 10 (see FIG. 3), respectively. The first right guide groove 260 and the first left guide groove 264 are at positions and have shapes symmetrical to each other in the left-right direction. The second right guide groove 262 and the second left guide groove 266 are at positions and have shapes symmetrical to each other in the left-right direction.

(How to Attach and Detach Battery Pack 200 to and from Charger 10)

Next, with reference to FIG. 12 to FIG. 15, how to attach the battery pack 200 to the charger 10 and detach the battery pack 200 from the charger 10 will be described.

Figure 12:
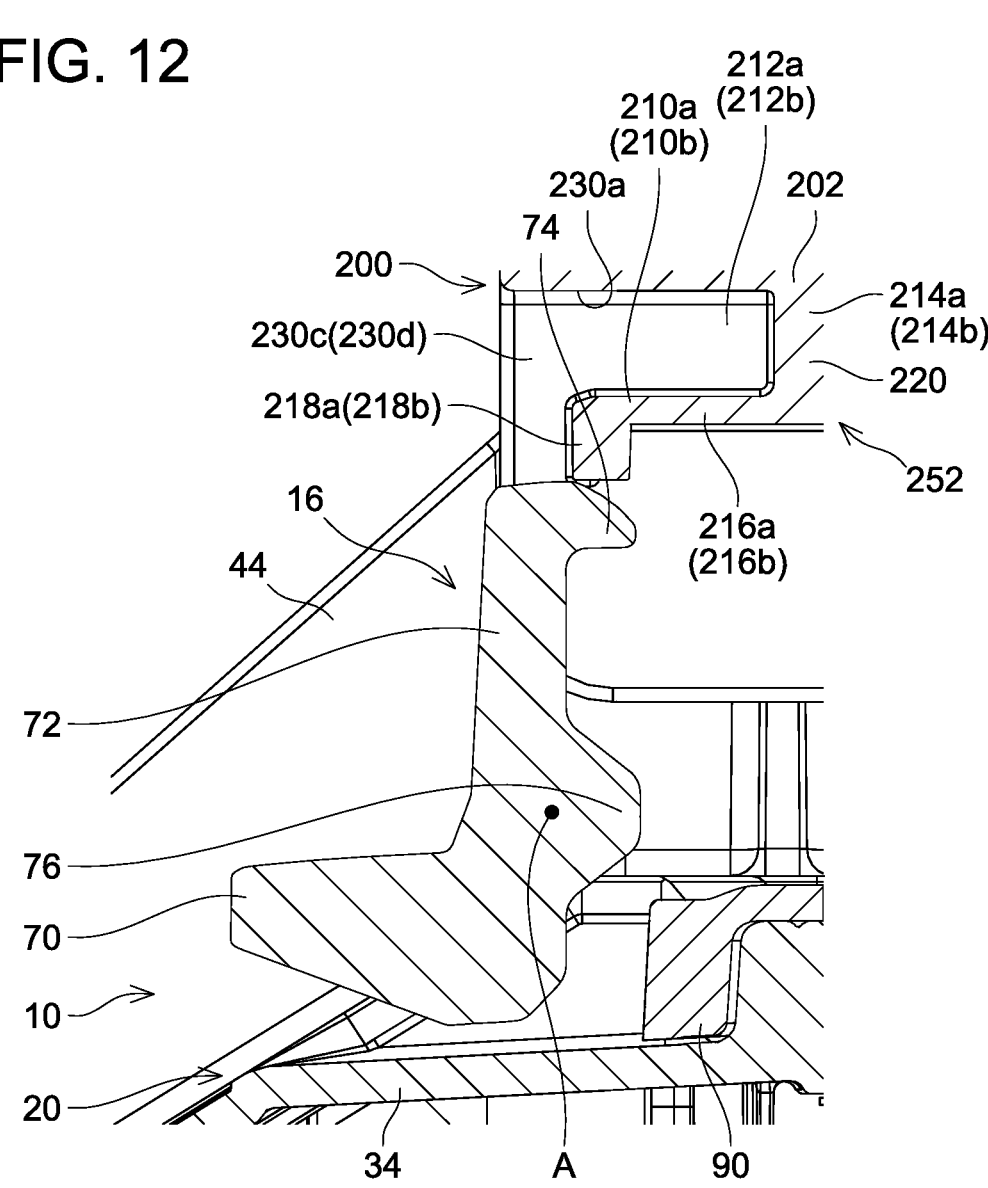
FIG. 12 is a cross-sectional view illustrating movement of the hook 16 of the first embodiment (1).
Figure 12:
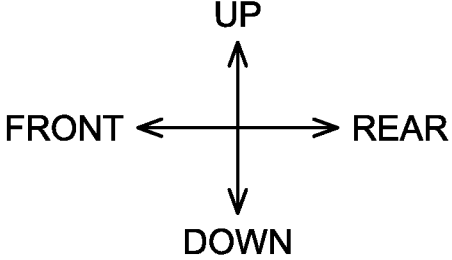
Figure 13:
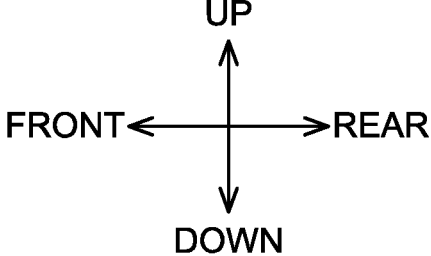
FIG. 13 is a cross-sectional view illustrating movement of the hook 16 of the first embodiment (2).

Firstly, with reference to FIG. 12 to FIG. 14, how to attach the battery pack 200 to the charger 10 will be described. As illustrated in FIG. 12, under the state where the battery pack 200 is not attached, the hook 16 is biased by the spring 140 (see FIG. 8) such that the rear wall 72 becomes substantially parallel to the up-down direction. In this state, when the worker moves the battery pack 200 downward to attach the battery pack 200 to the charger 10, the lower end of the right tip end 218*a* of the right engaging portion 210*a* and the lower end of the left tip end 218*b* of the left engaging portion 210*b* of the battery pack 200 come into contact with the engaging portions 74 of the hook 16 of the charger 10. When the worker further moves the battery pack 200 downward as illustrated in FIG. 13, the hook 16 rotes with the axis A as its rotation axis. Specifically, the engaging portions 74 moves forward, and at the same time, the operation part 70 moves downward.

Figure 14:
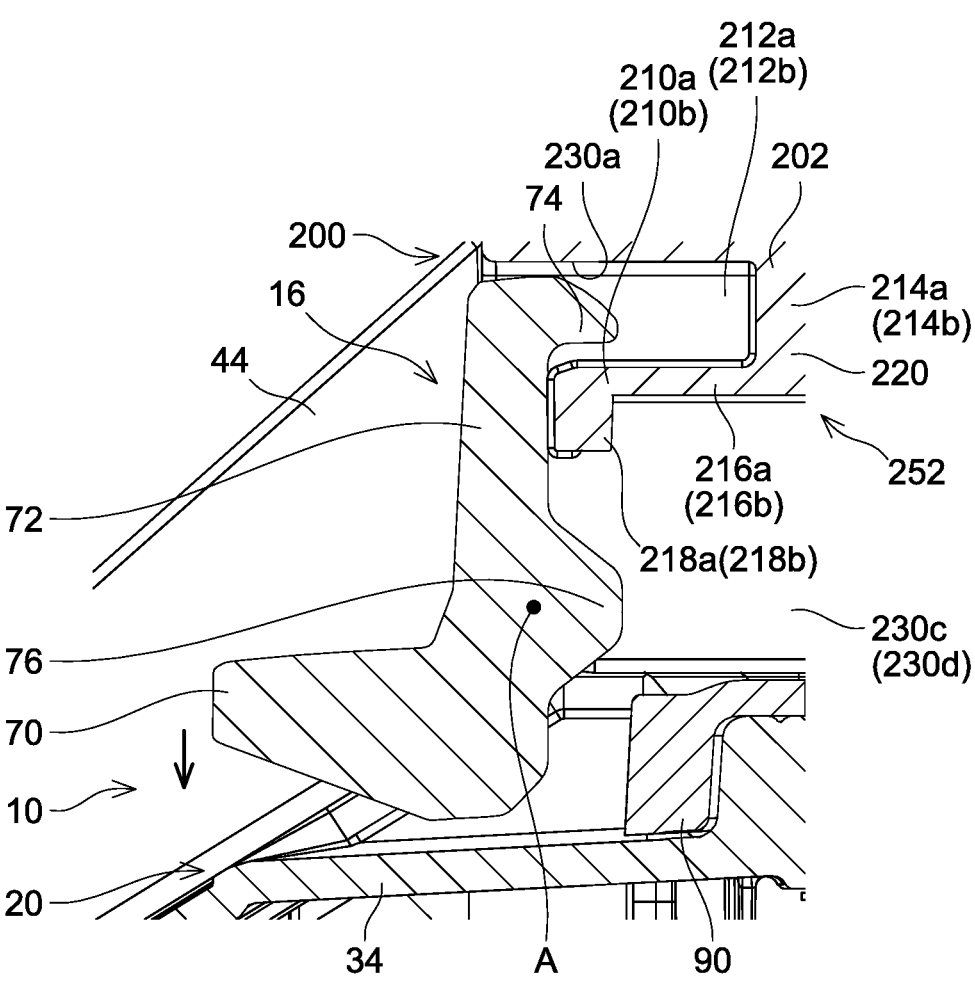
FIG. 14 is a cross-sectional view illustrating movement of the hook 16 of the first embodiment (3).
Figure 14:
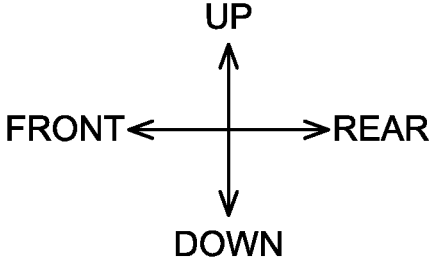

As illustrated in FIG. 14, when the upper end of the right extending portion 216*a* of the right engaging portion 210*a* and the upper end of the left extending portion 216*b* of the left engaging portion 210*b* of the battery pack 200 move downward beyond the engaging portions 74 of the hook 16 of the charger 10, the hook 16 rotates with the axis A as its rotation axis by biasing force of the spring 140. Specifically, the engaging portions 74 move rearward, and at the same time, the operation part 70 moves upward. Consequently, the engaging portions 74 of the charger 10 enter the right groove 212*a* and the left groove 212*b* of the battery pack 200. Under this state, even when the worker tries to move the battery pack 200 upward to detach the battery pack 200 from the charger 10, the upper end of the right extending portion 216*a* of the right engaging portion 210*a* and the upper end of the left extending portion 216*b* of the left engaging portion 210*b* of the battery pack 200 come into contact with the lower ends of the engaging portions 74, by which it is not possible to move the battery pack 200 upward. Thus, the state illustrated in FIG. 14 is a state in which the hook 16 is engaged with the right groove 212*a* and the left groove 212*b* of the battery pack 200 and the battery pack 200 is fixed to the charger 10. Hereafter, the position of the hook 16 when the battery pack 200 is fixed to the charger 10 may be referred to as a lock position. In this state, charging of the battery pack 200 is performed.

Figure 15:
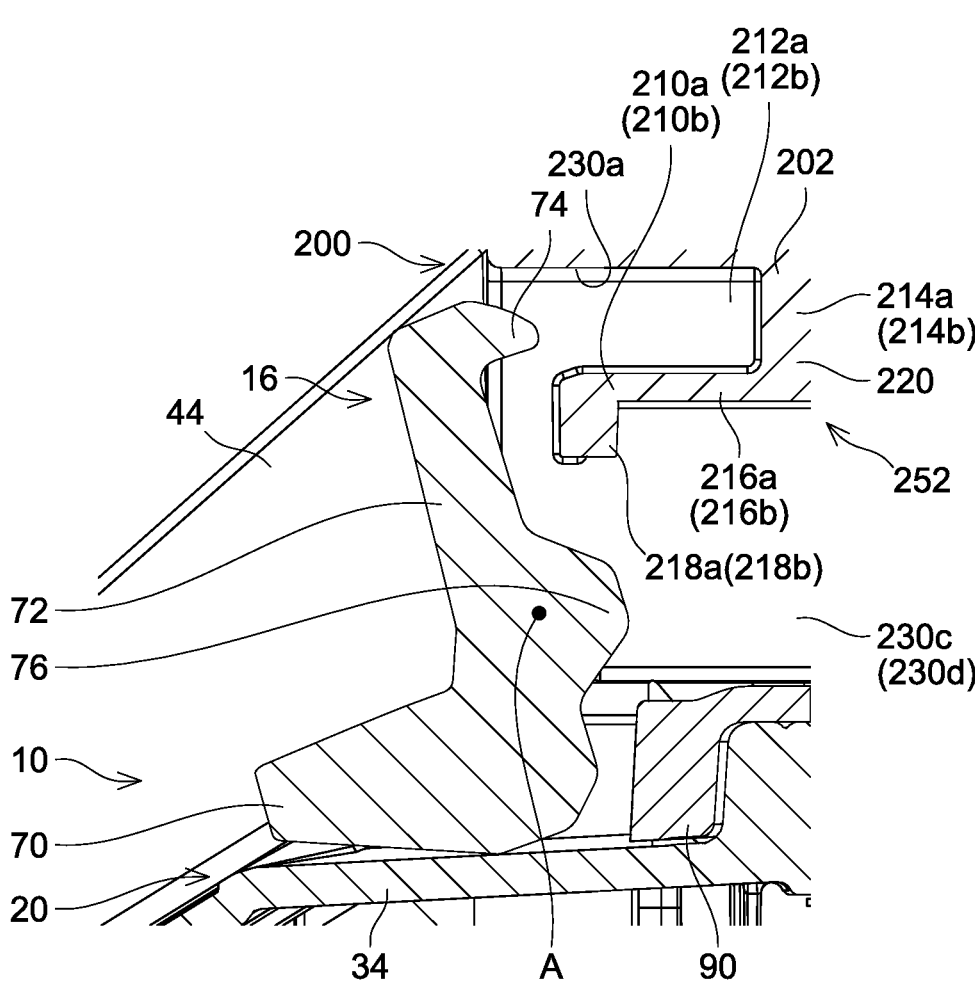
FIG. 15 is a cross-sectional view illustrating movement of the hook 16 of the first embodiment (4).
Figure 15:
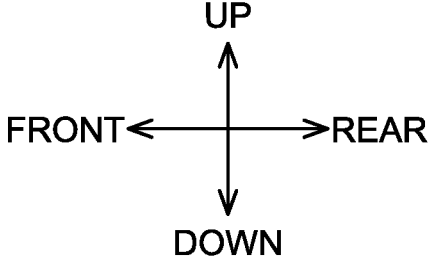

Then, when the charging of the battery pack 200 is completed, the worker detaches the battery pack 200 from the charger 10. Firstly, the worker presses down the operation part 70 of the hook 16. In this case, as illustrated in FIG. 15, the hook 16 rotates with the axis A as its rotation axis and the engaging portions 74 move forward. Consequently, the engaging portions 74 enter the state of not being disposed above the right extending portion 216*a* of the right engaging portion 210*a* and the left extending portion 216*b* of the left engaging portion 210*b* of the battery pack 200. Thus, the worker can move the battery pack 200 upward and detach the battery pack 200 from the charger 10. Hereafter, a position of the hook 16 when the battery pack 200 is not fixed to the charger 10 may be referred to as an unlock position. Then, the worker releases his/her hand from the operation part 70 of the hook 16 after detaching the battery pack 200 from the charger 10. In this case, as illustrated in FIG. 12, the hook 16 rotates with the axis A as its rotation axis by biasing force of the spring 140. Specifically, the engaging portions 74 move rearward, and at the same time, the operation part 70 moves upward and the position of the hook 16 is changed from the unlock position to the lock position.

As illustrated in FIGS. 1 to 15, the charger 10 of one embodiment comprises: the body case 12 comprising the center upper wall 34 having the opening 40 and the bottom wall 22*a*; and the terminal unit 14 covering the opening 40 from above and including the apparatus-side terminals 120 corresponding to the battery-side terminals 242, and the upper rib 50 extending upward from the upper surface 34*a* of the center upper wall 34 is disposed at least partially around the opening 40. When the charger 10 is viewed from above, the upper rib overlaps the terminal unit 14. According to the above configuration, by virtue of the terminal unit 14 covering the opening 40 in the center upper wall 34 from above, entry of water into the body case 12 is suppressed. Moreover, by the upper rib 50, it is possible to suppress water that has reached the upper surface 34*a* outward of the opening 40 and the upper rib 50 from adversely entering the body case 12 through the opening 40. Accordingly, entry of water into the body case 12 of the charger 10 can be suppressed.

As illustrated in FIG. 4 to FIG. 6, in the charger 10 of one embodiment, the upper rib 50 is in contact with the lower surface 90*b* of the base 90 of the terminal unit 14. According to the above configuration, it is possible to suppress water that has reached the upper end of the upper rib 50 from entering the body case 12.

As illustrated in FIG. 4 to FIG. 6, in the charger 10 of one embodiment, the lower rib 110 extending downward from the lower surface 90*b* is disposed at the lower surface 90*b* of the base 90 of the terminal unit 14 and is in contact with the upper surface 34*a* of the center upper wall 34 of the charger 10. The upper rib 50 faces the lower rib 110. According to the above configuration, entry of water toward the opening 40 beyond the upper rib 50 can be suppressed by the lower rib 110. Accordingly, entry of water into the body case 12 of the charger 10 can further be suppressed.

As illustrated in FIG. 5 to FIG. 7, in the charger 10 of one embodiment, the inclined portion is disposed on the upper surface 34*a* of the center upper wall 34 of the charger 10 and the inclined portion inclines such that the front side of the front-rear direction is located lower than the rear side of the front-rear direction. The upper rib 50 may be disposed on the rear side of the opening 40 in the front-rear direction. According to the above configuration, in the front-rear direction, water that has reached the upper surface 34*a* of the center upper wall 34 on the rear side of the opening 40 flows from the rear side to the front side. Then, the water that has reached the upper rib 50 flows in the left-right direction, and then further flows from the rear side to the front side. In other words, the water flows outside the opening 40. Thus, it is possible to suppress accumulation of water around the opening 40 and suppress entry of the water into the body case 12 of the charger 10 through the opening 40.

As illustrated in FIG. 4, FIG. 7 and FIG. 11, in the charger 10 of one embodiment, the body case 12 comprises the through holes 52*a*, 54*a* penetrating the center upper wall 34 in the up-down direction and the terminal unit 14 comprises the boss portions 112, 114 extending downward from the lower surface 90*b* of the base 90, having shapes corresponding to the through holes 52*a*, 54*a* and configured to have screws B attached from below. The diameter of each of the through holes 52*a*, 54*a* is larger than the outer diameter of each of the boss portions 112, 114, an outer diameter of the flange C of each of the screws B is larger than the diameter of each of the through holes 52*a*, 54*a*. When the screws B are screwed into the boss portions 112, 114, the body case 12 is clamped by the screws B and the terminal unit 14 in the up-down direction. According to the aforementioned configuration, under the state where the terminal unit 14 and the body case 12 are assembled, the terminal unit 14 can move in the horizontal direction with respect to the body case 12. Thus, even when the positions of the apparatus-side terminals 120 are displaced with respect to the battery-side terminals 242 in the horizontal direction, the apparatus-side terminals 120 come to correct positions with respect to the battery-side terminals 242 by the terminal unit 14 moving with respect to the battery pack 200. Thus, it is possible to suppress occurrence of the unintended contact between the apparatus-side terminals 120 and the battery-side terminals 242 upon attachment of the battery pack 200 to the charger 10, and it is possible to suppress deformation of the apparatus-side terminals 120 and the battery-side terminals 242.

As illustrated in FIG. 7 and FIG. 11, in the charger 10 of one embodiment, the body case 12 includes the two through holes 52*a*, 54*a* that face each other across the opening 40, and the terminal unit 14 comprises the two boss portions 112, 114 corresponding to the two through holes 52*a*, 54*a*. According to the above configuration, the body case 12 can firmly be clamped by the screws B and the terminal unit 14.

As illustrated in FIG. 2, the charger 10 of one embodiment further comprises the hook 16 attached to the terminal unit 14 outside the body case 12 and configured to engage with the right groove 212a and the left groove 212b of the battery pack 200. According to the aforementioned configuration, by virtue of the hook 16 being attached to the terminal unit 14 outside the body case 12, it is not necessary to define an opening in the body case 12 for the hook 16 to extends from within the body case 12 to the outside thereof. Accordingly, entry of water into the body case 12 of the charger 10 can be suppressed.

(Corresponding Relationships)

The charger 10 is an example of "electrical apparatus". The center upper wall 34 is an example of "upper wall". The upper rib 50 is an example of "first rib". The lower rib 110 is an example of "second rib". The front-rear direction, the front side and the rear side are an example of "first direction", "first side" and "second side", respectively. The boss portions 112, 114 are examples of "protruding part".

Second Embodiment

Figure 26:
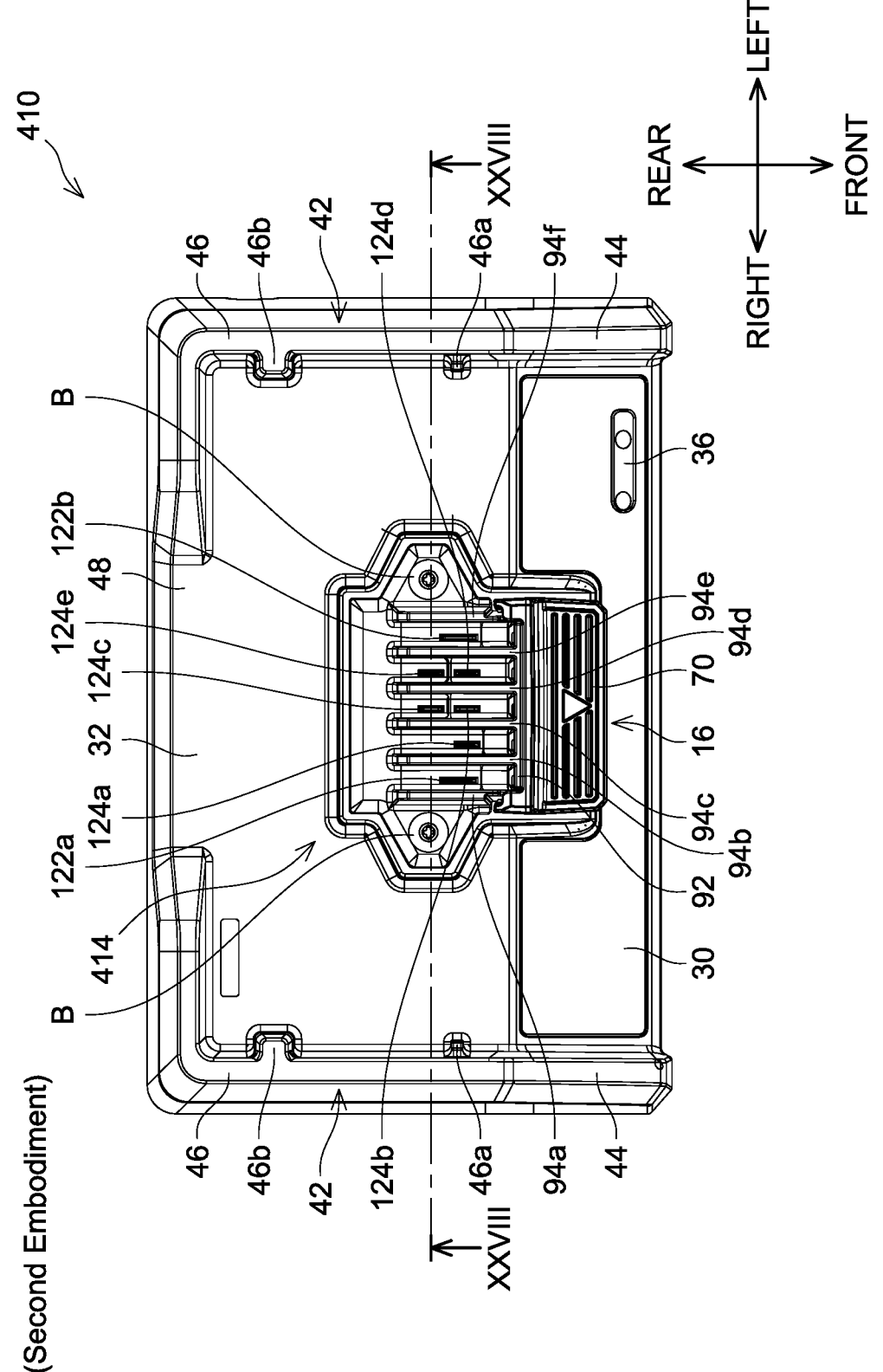
FIG. 26 is a top view of a charger 410 of a second embodiment viewed from above.
Figure 27:
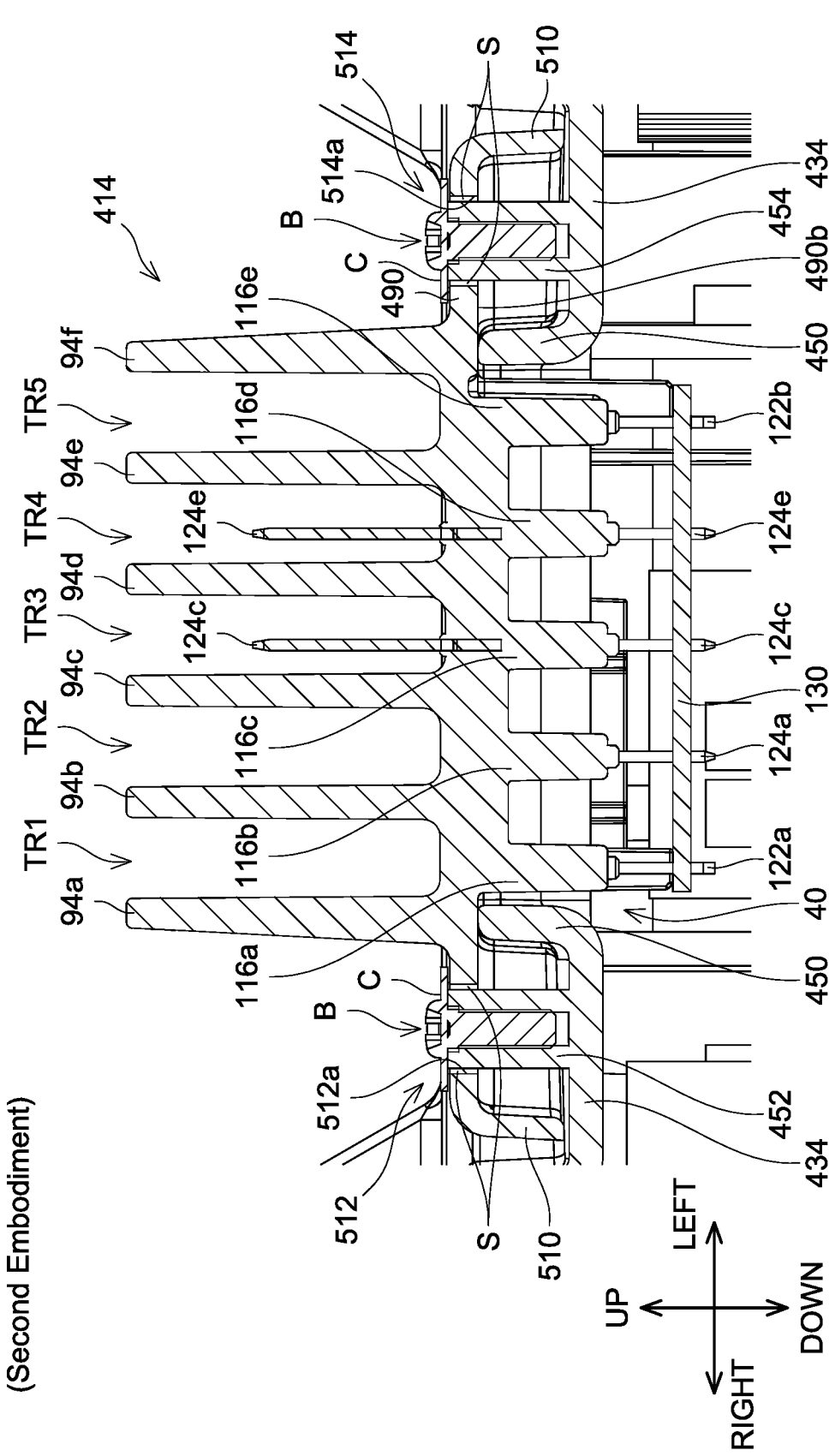
FIG. 27 is a cross-sectional view along a XXVII-XXVII line of FIG. 26.

With reference to FIG. 26 and FIG. 27, a charger 410 of the present embodiment will be described. The charger 410 of the present embodiment is different from the charger 10 of the first embodiment in structures of a terminal unit 414 and a center upper wall 434 of the body case 12. Hereafter, the same reference signs are given to the structures common between the embodiments, and explanation thereof will be omitted.

As illustrated in FIG. 27, the terminal unit 414 includes lower ribs 510 extending downward from a lower surface 490b of a base 490. An attachment portions 512 is disposed between the side rib 94a disposed on the rightmost side of the terminal unit 414 and the lower rib 510, and an attachment portion 514 is disposed between the side rib 94f disposed on the leftmost side of the terminal unit 414 and the lower rib 510. The attachment portions 512, 514 include through holes 512a, 514a penetrating the base 490 of the terminal unit 414 in the up-down direction.

An upper rib 450 extending upward from the upper surface of the center upper wall 434 is disposed around the opening 40. A boss portion 452 is disposed rightward of the upper rib 450 and the side rib 94a disposed on the rightmost side of the terminal unit 414, and a boss portion 454 is disposed leftward of the upper rib 450 and the side rib 94f disposed on the leftmost side of the terminal unit 414. The boss portions 452, 454 extend upward from the upper surface of the center upper wall 434. The boss portions 452, 454 are disposed at positions corresponding to attachment portions 512, 514 of the terminal unit 414. An outer diameter of each of the boss portions 452, 454 is smaller than a diameter of each of the through holes 512a, 514a of the attachment portions 512, 514. In the present embodiment, screws B including flanges C each having an outer diameter greater than a diameter of each of the through holes 512a, 514a are screwed into the boss portions 452, 454. The terminal unit 414 is clamped between the screws B and the body case 12, by which the terminal unit 414 is attached to the body case 12. Under the state where the terminal unit 414 is attached to the body case 12, spaces S are defined between the boss portions 452, 454 and the attachment portions 512, 514 in the left-right direction. Thus, the terminal unit 414 can slightly move in the horizontal direction with respect to the body case 12. With such a configuration as well, the same effect provided by the charger 10 of the first embodiment can be achieved.

Third Embodiment

With reference to FIG. 28 to FIG. 35, a charger 610 of the present embodiment will be described. A battery pack (not illustrated) that can be attached to the charger 610 of the present embodiment is different from the battery pack 200 that can be attached to the charger 10 of the first embodiment.

Figure 28:
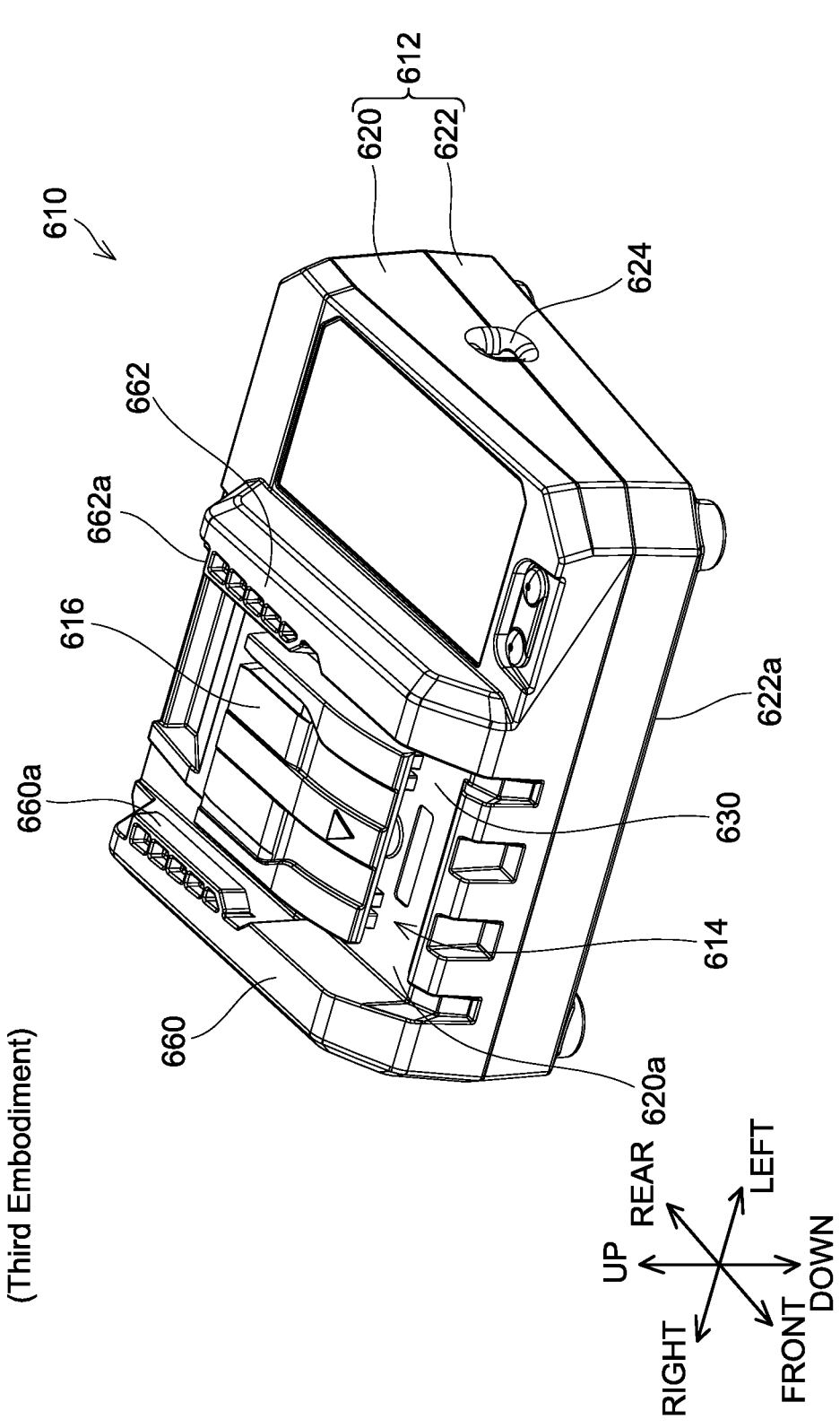
FIG. 28 is a perspective view of a charger 610 of a third embodiment viewed from the left upper front side.
Figure 29:
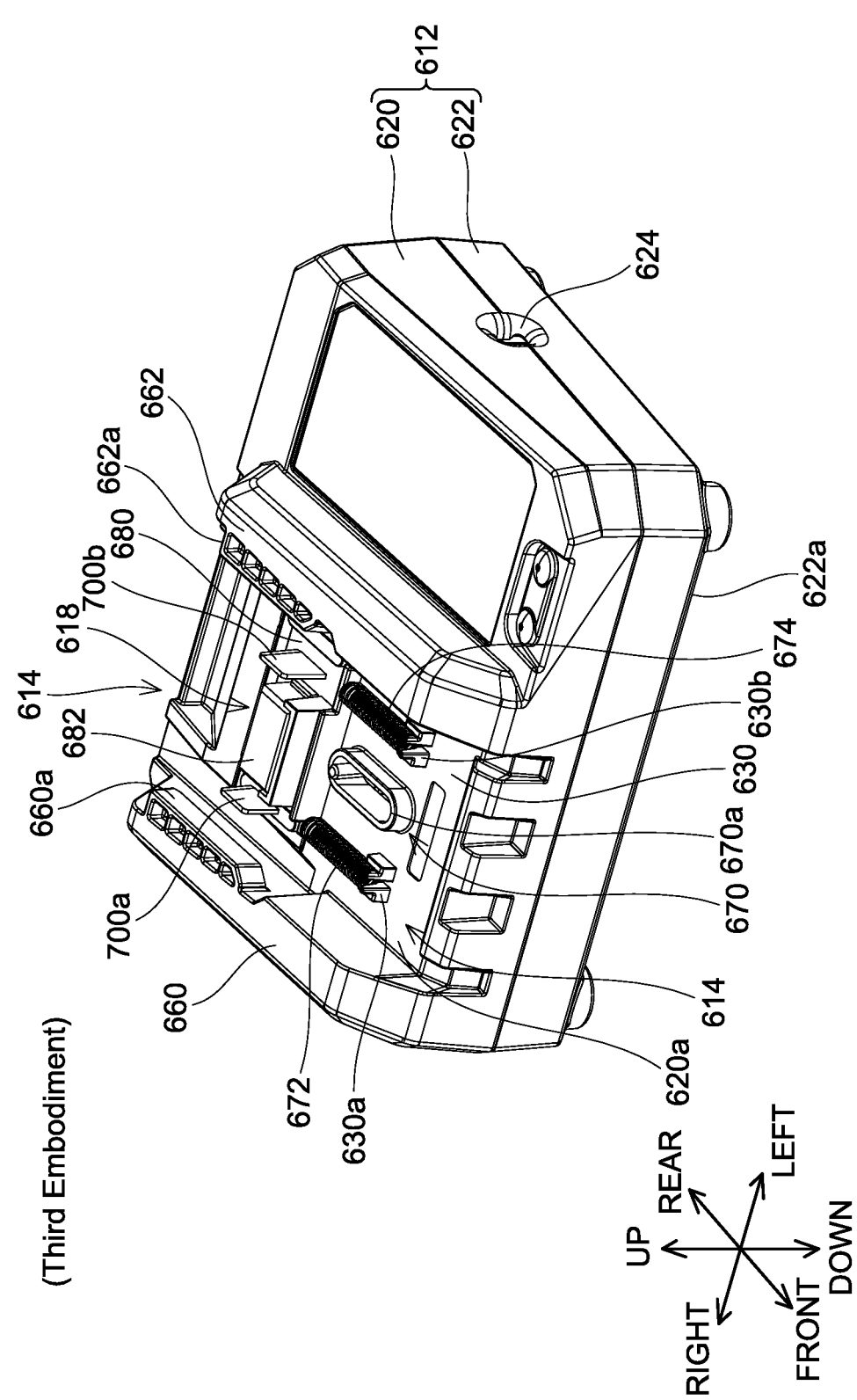
FIG. 29 is a perspective view of the charger 610 with a terminal cover 616 detached in the third embodiment, viewed from the left upper front side.

As illustrated in FIG. 28, the charger 610 includes a body case 612, a battery pack attachment portion 614, a terminal cover 616 and a terminal unit 618 (see FIG. 29). The body case 612 includes an upper case 620 and a lower case 622. The upper case 620 and the lower case 622 are fixed by screws (not illustrated). When the charger 610 is placed on a placement surface, a bottom wall 622a of the lower case 622 faces the placement surface. A cable opening 624 defined by the upper case 620 and the lower case 622 is defined in the left side surface of the body case 612. The cable opening 624 is an opening to allow a power cable (illustration omitted) to pass therethrough. The battery pack attachment portion 614 is disposed at a right portion of the charger 610. The terminal cover 616 and the terminal unit 618 (see FIG. 29) are disposed on the battery pack attachment portion 614.

Figure 30:
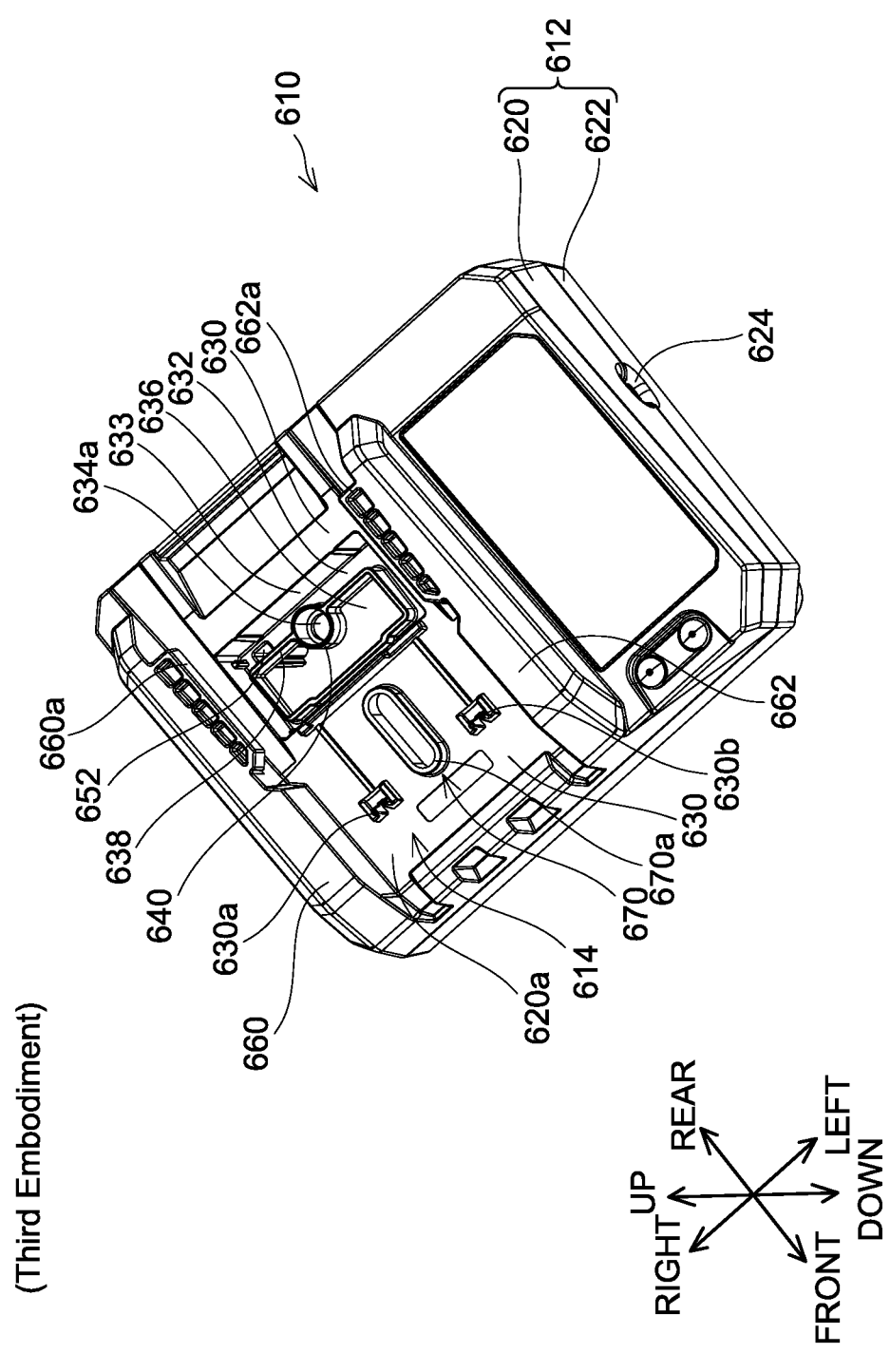
FIG. 30 is a perspective view of the charger 610 with the terminal cover 616, a terminal unit 618 and springs 672, 674 detached in the third embodiment, viewed from the left upper front side.
Figure 31:
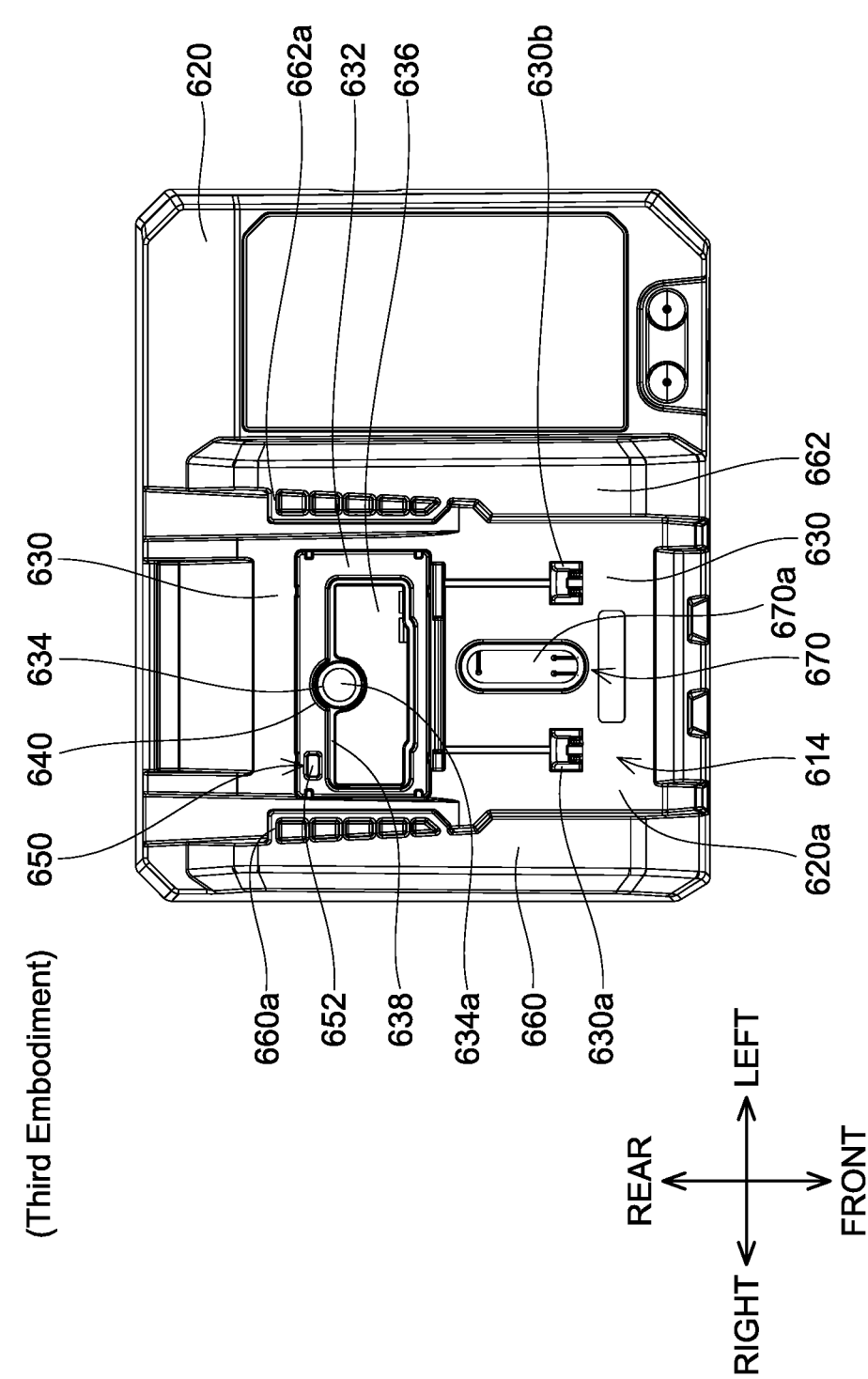
FIG. 31 is a top view of the charger 610 with the terminal cover 616, the terminal unit 618 and the springs 672, 674 detached in the third embodiment viewed from above.
Figure 34:
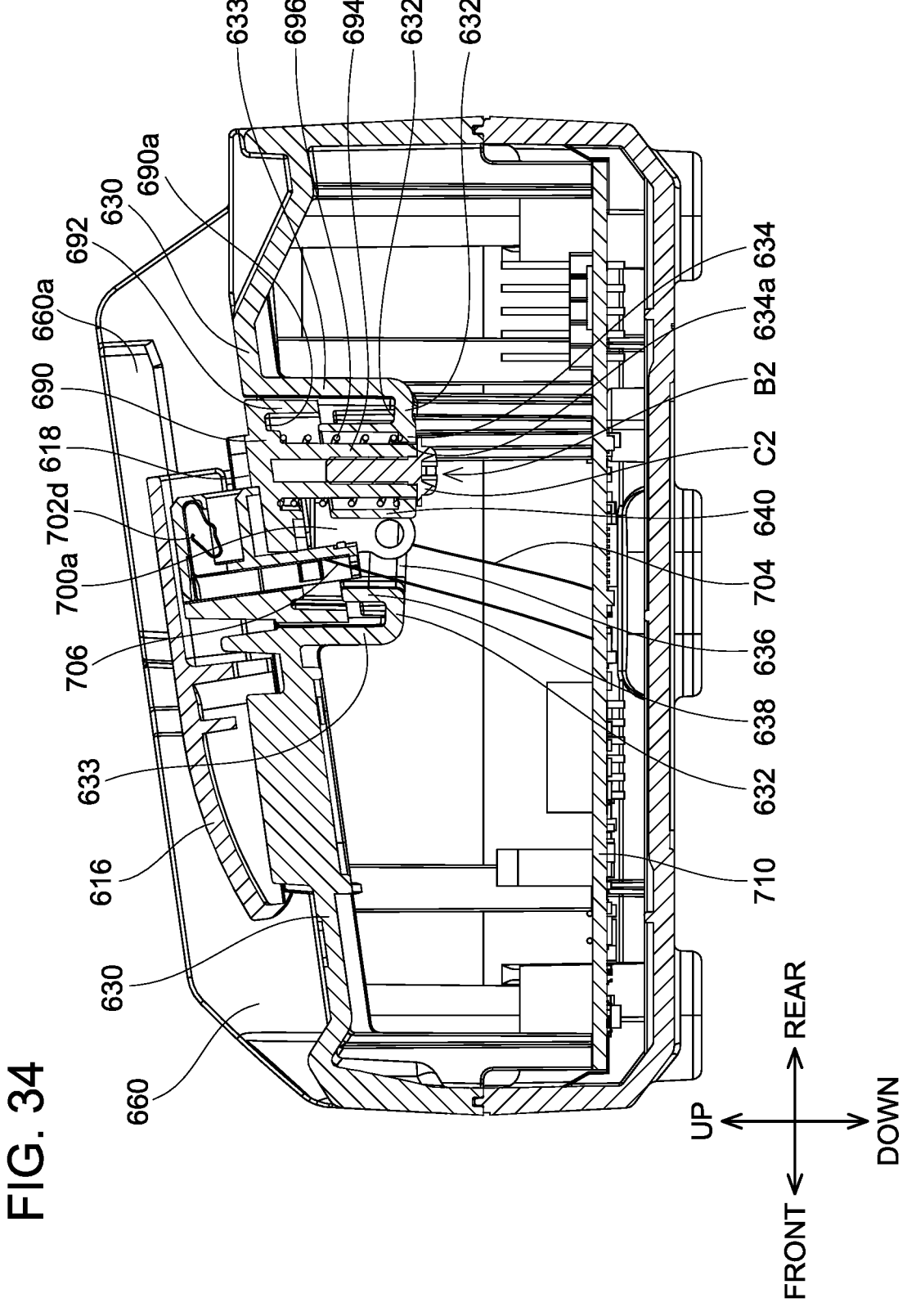
FIG. 34 is a cross-sectional view of the charger 610 of the third embodiment viewed from the left side.

As illustrated in FIG. 30 and FIG. 31, among the upper case 620, a portion of the upper wall 620a at which the battery pack attachment portion 614 is disposed is constituted of an outer upper wall 630 and an inner upper wall 632. The inner upper wall 632 is surrounded by the outer upper wall 630. As illustrated in FIG. 34, the outer upper wall 630 inclines such that its front side is inclined downward. A height of the inner upper wall 632 is smaller than a height of the outer upper wall 630. The inner upper wall 632 inclines such that its rear side is inclined downward. Among the inner upper wall 632, a portion at which a cylindrical rib 640 to be described (hereafter this portion may be referred to as "unit attachment portion 634") is disposed is parallel to a plane including the left-right direction and the front-rear direction. The unit attachment portion 634 includes a through hole 634a penetrating the inner upper wall 632 in the up-down direction. The outer upper wall 630 and the inner upper wall 632 are connected by a connecting wall 633 extending in the up-down direction.

As illustrated in FIG. 31, an opening 636 is defined in the inner upper wall 632. An upper rib 638 extending upward from the upper surface 632a of the inner upper wall 632 is disposed around the opening 636. The upper rib 638 surrounds the entire periphery of the opening 636. The upper rib 638 includes a cylindrical rib 640. The cylindrical rib 640 is disposed at the rear end of the opening 636 and in the vicinity of the center of the opening 636 in the left-right direction. As illustrated in FIG. 34, the cylindrical rib 640 extends upward from the unit attachment portion 634 (i.e., the inner upper wall 632). An inner diameter of the cylindrical rib 640 is greater than a diameter of the through hole 634a of the unit attachment portion 634. The upper end of the cylindrical rib 640 inclines such that its front side is inclined downward.

Figure 36:
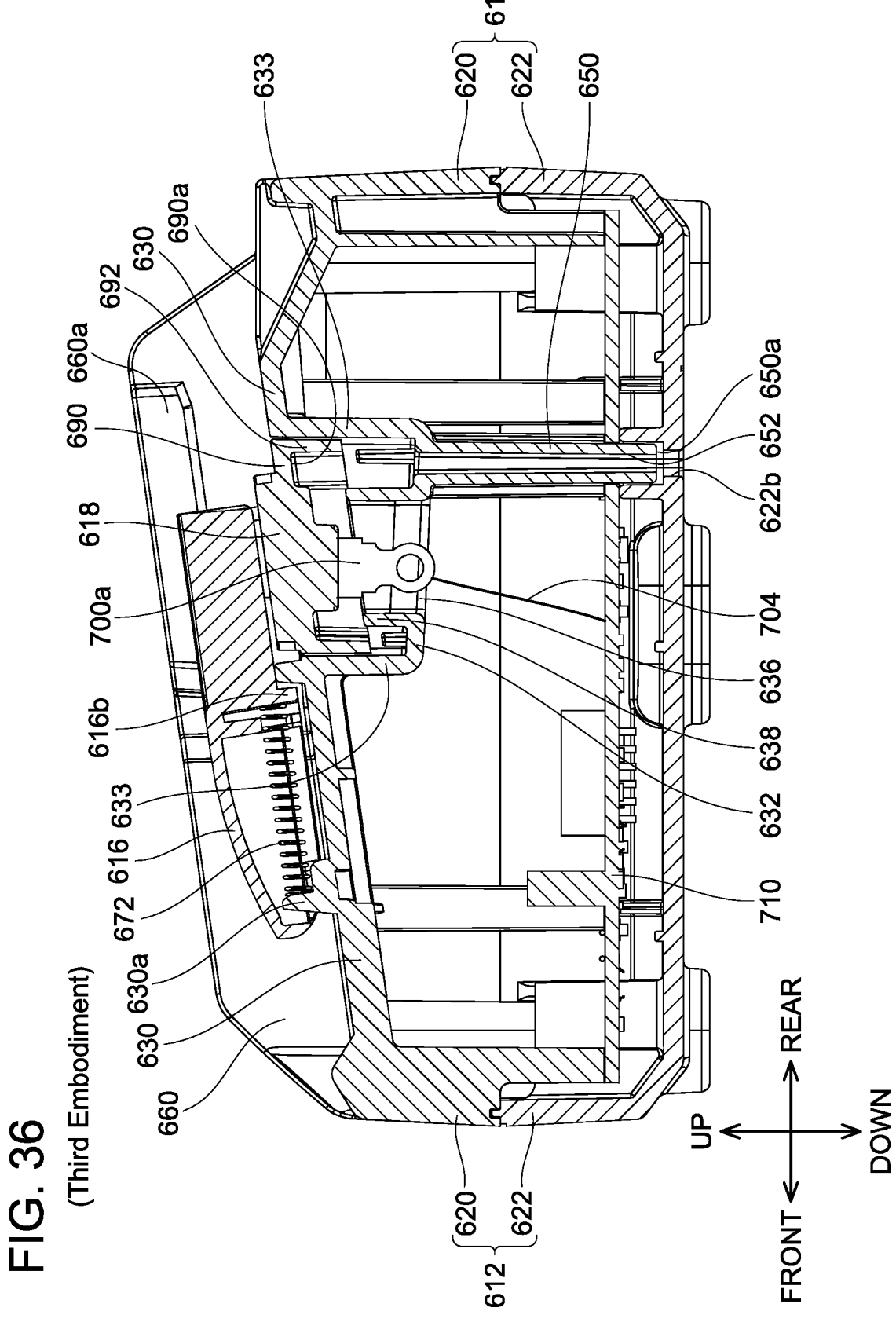
FIG. 36 is a cross-sectional view of the charger 610 of the third embodiment viewed from the left side.

As illustrated in FIG. 36, a drain portion 650 is disposed on the upper case 620. The drain portion 650 extends downward from the lower surface of the inner upper wall 632. A drain hole 652 extending in the up-down direction is defined in the drain portion 650. An upper portion of the drain hole 652 is disposed at the inner upper wall 632. As illustrated in FIG. 31, the drain portion 650 is on the right side of the cylindrical rib 640. As illustrated in FIG. 36, the lower end 650a of the drain portion 650 is located slightly higher than the bottom wall 622a of the lower case 622. A drain hole 622b is defined in the bottom wall 622a at a position facing the drain hole 652 of the drain portion 650. Water that has reached the upper surface of the inner upper wall 632 of the upper case 620 is drained to the outside by passing through the drain hole 652 of the drain portion 650 and the drain hole 622b in the bottom wall 622a.

As illustrated in FIG. 28, the upper case 620 further includes a right standing portion 660 and a left standing portion 662. The right standing portion 660 and the left standing portion 662 extend upward from the outer upper wall 630. The right standing portion 660 is formed at the right end of the outer upper wall 630 and the left standing portion 662 is formed at the left end of the outer upper wall 630. A right battery rail 660a is disposed at a rear portion of the right standing portion 660. A left battery rail 662a is disposed at a rear portion of the left standing portion 662. The right battery rail 660a and the left battery rail 662a have shapes corresponding to battery-side rails (illustration omitted) of a battery pack.

Figure 35:
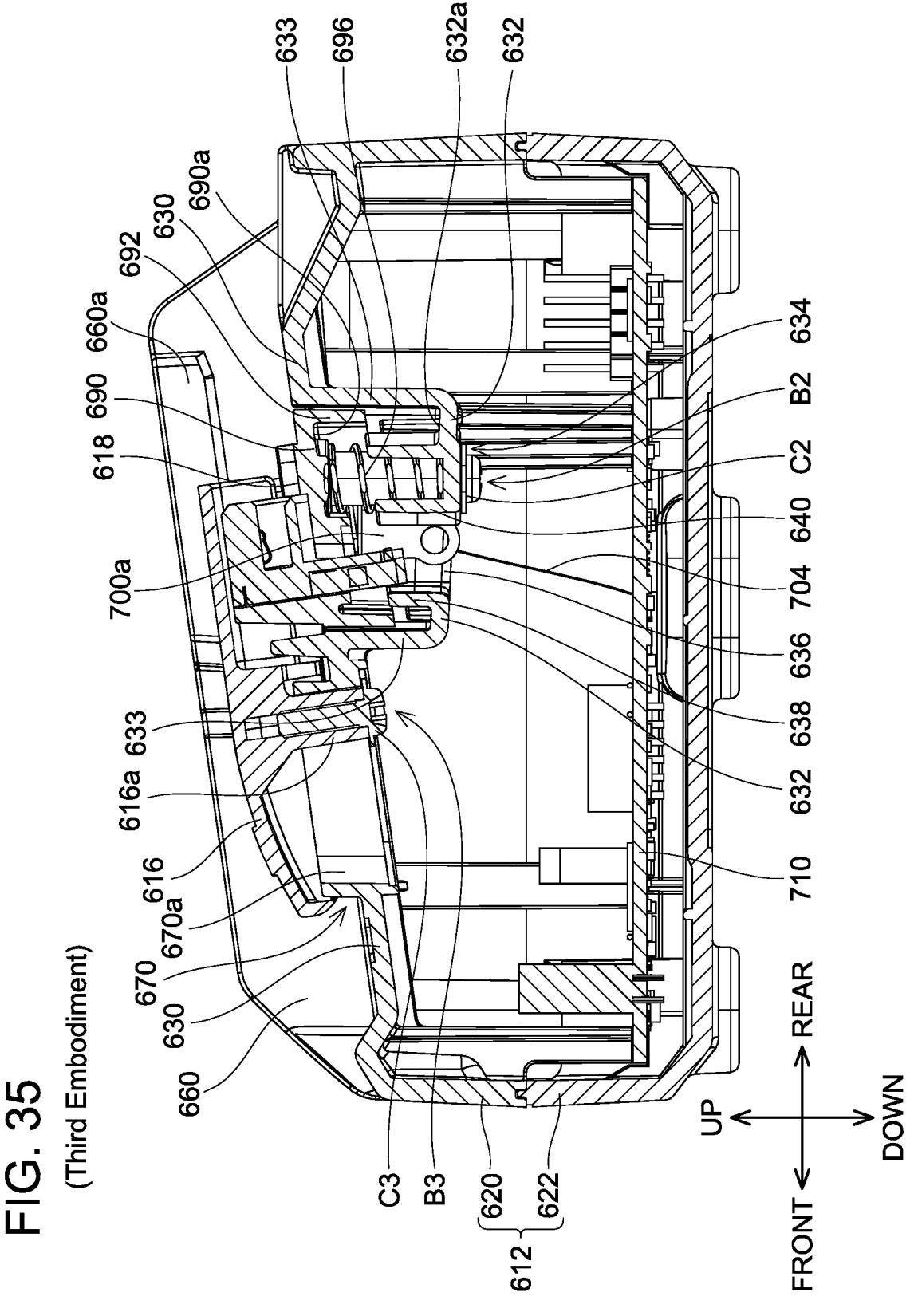
FIG. 35 is a cross-sectional view of the charger 610 of the third embodiment viewed from the left side.

As illustrated in FIG. 29, a cover attachment portion 670 and springs 672, 674 are disposed at the battery pack attachment portion 614 of the upper case 620. The cover attachment portion 670 and the springs 672, 674 are disposed frontward of the inner upper wall 632 (see FIG. 30). The cover attachment portion 670 includes an attachment hole 670a extending in the front-rear direction. As illustrated in FIG. 35, the terminal cover 616 includes a boss portion 616a extending downward from the upper wall of the terminal cover 616. The boss portion 616a is disposed in the vicinity of the center of the terminal cover 616 in the left-right direction. An outer diameter of the boss portion 616a is smaller than a width of the attachment hole 670a in the left-right direction. A screw B3 having a flange C3 having an outer diameter greater than the width of the attachment hole 670a in the left-right direction is screwed into the boss portion 616a from below the cover attachment portion 670. Consequently, the terminal cover 616 is attached to the body case 612.

As illustrated in FIG. 29, a right case spring seat 630a and a left case spring seat 630b are disposed on the outer upper wall 630 of the upper case 620. The right case spring seat 630a is disposed rightward of the attachment hole 670a and the left case spring seat 630b is disposed leftward of the attachment hole 670a. A position of the right case spring seat 630a in the front-rear direction and a position of the left case spring seat 630b in the front-rear direction are coincident. As illustrated in FIG. 36, under the state where the terminal cover 616 is attached to the cover attachment portion 670, the right case spring seat 630a is positioned rearward of the front end of the terminal cover 616. A right cover spring seat 616b extending downward from an upper wall of the terminal cover 616 is disposed rightward of the terminal cover 616. A position of the right cover spring seat 616b in the left-right direction and a position of the right case spring seat 630a in the left-right direction are coincident. A spring 672 is disposed between the right cover spring seat 616b and the right case spring seat 630a. A left cover spring seat (illustration omitted) is disposed leftward of the terminal cover 616. A left cover spring seat (illustration omitted) extending downward from the upper wall of the terminal cover 616 is disposed leftward of the terminal cover 616. A position of the left cover spring seat in the left-right direction and a position of the left case spring seat 630b in the left-right direction are coincident. The spring 674 is disposed between the left cover spring seat and the left case spring seat 630b. The springs 672, 674 bias the terminal cover 616 with respect to the upper case 620 from a release position to a protected position. When the terminal cover 616 is in the release position, charging terminals 700a, 700b to be described are exposed and when the terminal cover 616 is in the protected position, the charging terminals 700a, 700b are protected by the terminal cover 616 (see FIG. 28, FIG. 36). When the charger 610 is viewed from above, the terminal cover 616 covers a part of the terminal unit 618, a part of the outer upper wall 630 and a part of the inner upper wall 632 from above.

Figure 32:
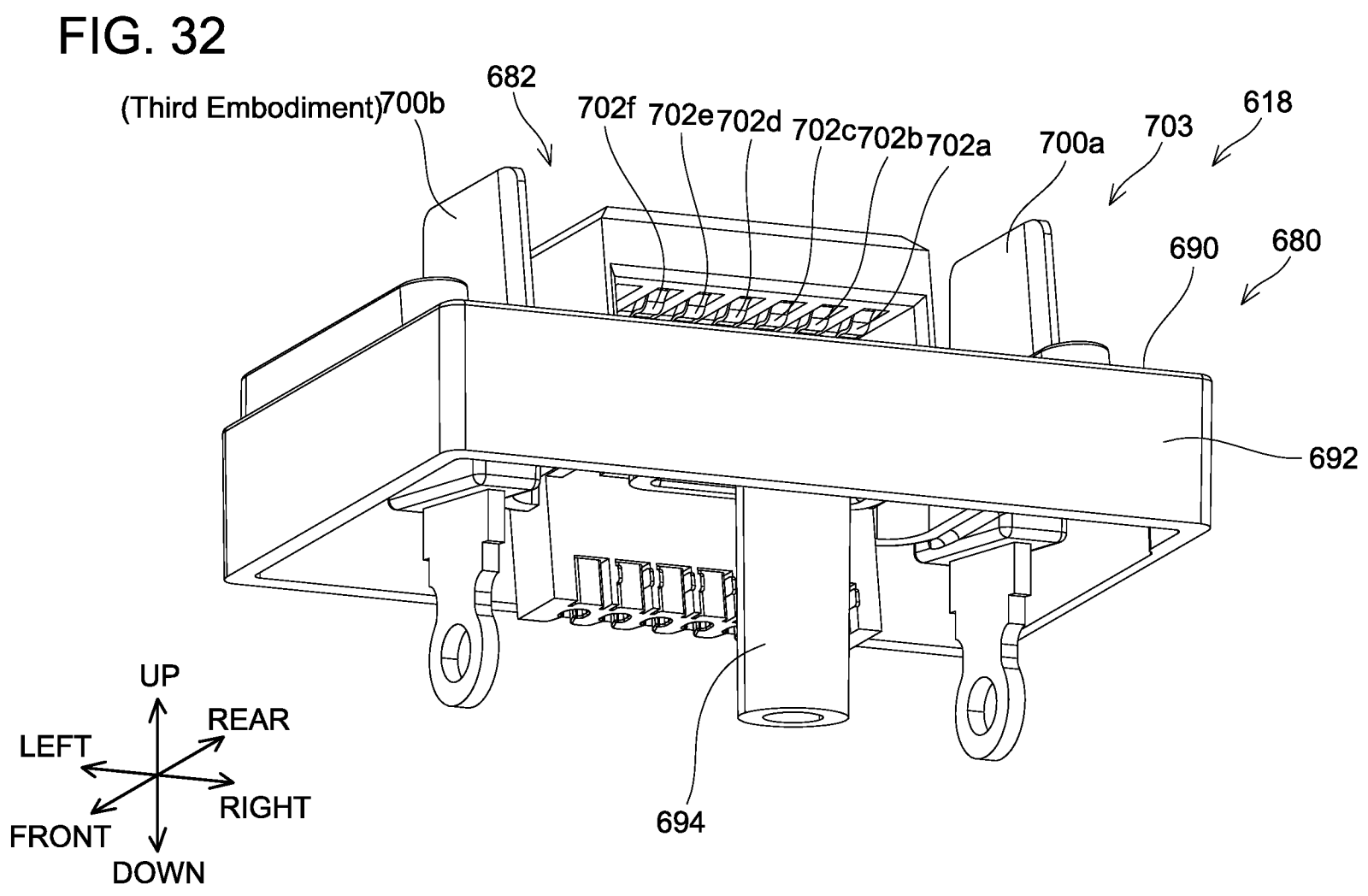

The terminal unit 618 includes a charging terminal fixing portion 680 and a signal terminal housing 682. The signal terminal housing 682 is attached to the charging terminal fixing portion 680. As illustrated in FIG. 32, the charging terminal fixing portion 680 includes a base 690, a lower rib 692 and a boss portion 694. Charging terminals 700a, 700b used for charging the battery pack is attached to the base 690. The charging terminals 700a, 700b are disposed with a space therebetween in the left-right direction. As illustrated in FIG. 34, a lower portion of the charging terminal 700a passes through the opening 636 in the inner upper wall 632 in the up-down direction. A harness 704 is connected to a lower portion of the charging terminal 700a. The charging terminal 700a is connected to a control board 710 housed in the body case 612 via the harness 704. The lower rib 692 extends downward from the lower surface 690a of the base 690. An outer profile of the lower rib 692 has a shape corresponding to an inner profile of the connecting wall 633. The boss portion 694 is disposed inside the lower rib 692. The boss portion 694 extends downward from the lower surface 690a of the base 690. The boss portion 694 is disposed at a position corresponding to the unit attachment portion 634 of the upper case 620. An outer diameter of the boss portion 694 is smaller than a diameter of the through hole 634a of the unit attachment portion 634. In the present embodiment, a screw B2 having a flange C2 having an outer diameter greater than the diameter of the through hole 634a is screwed into the boss portion 694 from below the unit attachment portion 634 of the upper case 620. Consequently, the terminal unit 618 is attached to the body case 612. A spring 696 is disposed between the boss portion 694 and the cylindrical rib 640. The spring 696 adjusts a position of the terminal unit 618 with respect to the upper case 620 in the up-down direction.

Figure 33:
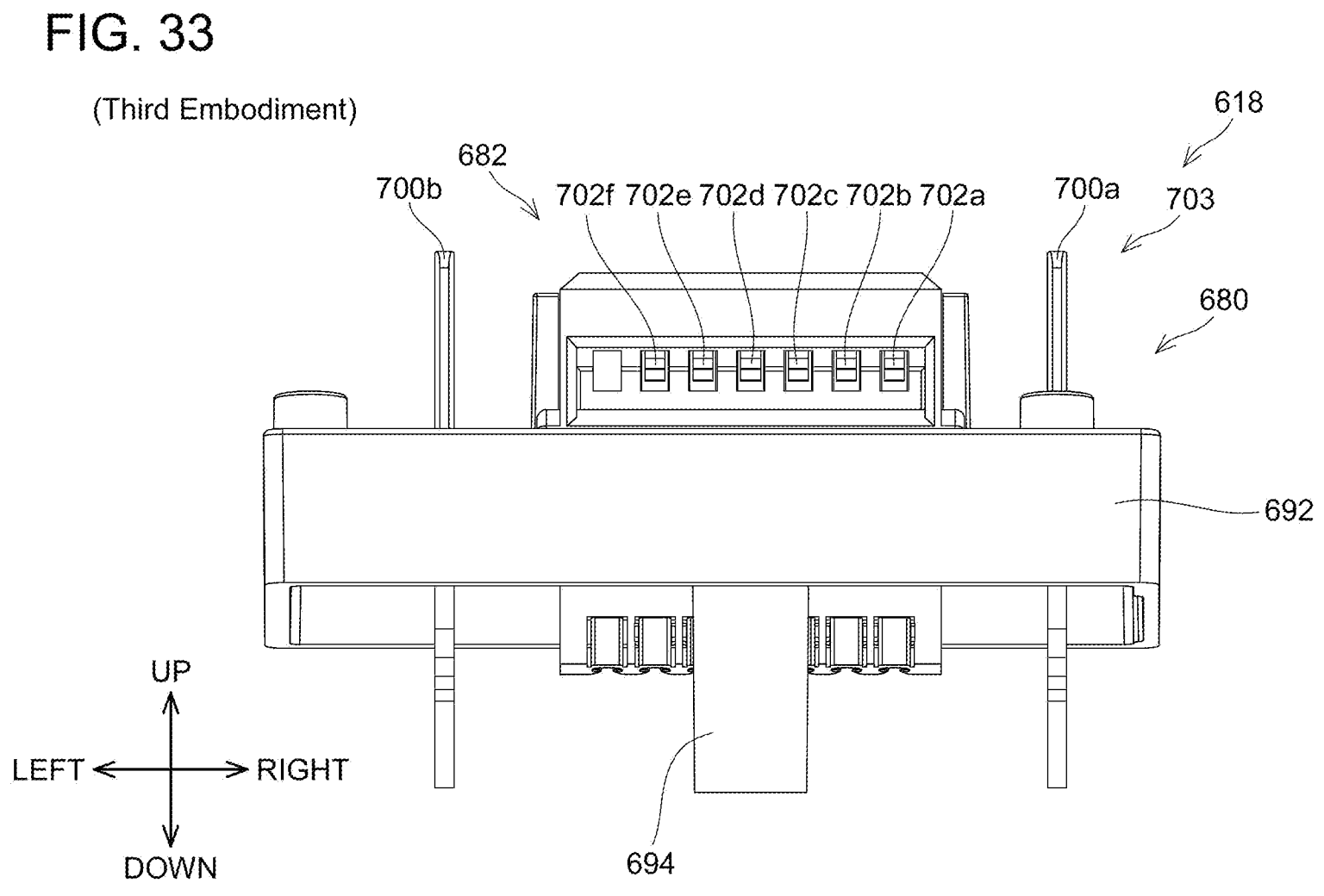

As illustrated in FIG. 32 and FIG. 33, the signal terminal housing 682 has a shape in which the rear portion is opened. Signal terminals 702a to 702f are attached to the signal terminal housing 682. The signal terminals 702a to 702f are arranged side-by-side in the left-right direction. The signal terminals 702a to 702f are disposed between the charging terminals 700a, 700b in the left-right direction. As illustrated in FIG. 34, a harness 706 is connected to a lower portion of the signal terminal 702d. The signal terminal 702d is electrically connected to the control board 710 via the harness 706. The harness 706 passes through the opening 636 in the inner upper wall 632 in the up-down direction. Similarly, the signal terminals 702a to 702c, 702e, 702f are electrically connected to the control board 710 via harnesses (illustration omitted). As described above, the opening 636 of the inner upper wall 632 is defined to allow the harnesses which connect the signal terminals 702a to 702f and the control board 710 to pass therethrough. With such a configuration as well, the same effect provided by the charger 10 of the first embodiment can be achieved. Hereafter, the charging terminals 700a, 700b and the signal terminals 702a to 702f may collectively be referred to as "apparatus-side terminals 703".

As illustrated in FIG. 28 to FIG. 35, the charger 610 according to one embodiment comprises: the body case 612 comprising the inner upper wall 632 having the opening 636 and the bottom wall 622a; and the terminal unit 618 covering the opening 636 and including the apparatus-side terminals 705 corresponding to the battery-side terminals, and the upper rib 638 extending upward from the upper surface 632a of the inner upper wall 632 is disposed at least partially around the opening 636. When the charger 610 is viewed from above, the upper rib 638 overlaps the terminal unit 618. According to the above configuration, by virtue of the terminal unit 618 covering the opening 636 in the inner upper wall 632 from above, entry of water into the body case 612 from above can be suppressed. Moreover, by the upper rib 638, it is possible to suppress water that has reached the upper surface 632a outward of the opening 636 and the upper rib 638 from adversely entering the body case 612 through the opening 636. Accordingly, entry of water into the body case 612 of the charger 610 can be suppressed.

As illustrated in FIG. 34, the charger 610 of one embodiment further includes the terminal cover 616 attached to the outer upper wall 630 of the body case 612. The terminal cover 616 covers a part of the terminal unit 618, a part of the outer upper wall 630 and a part of the inner upper wall 632 from above. According to the above configuration, by virtue of the terminal unit 618 coving the part of the outer upper wall 630 and the part of the inner upper wall 632, entry of water into the body case 612 from above can further be suppressed.

(Corresponding Relationships)

The charger 610 is an example of "electrical apparatus". The inner upper wall 632 is an example of "upper wall". The upper rib 638 is an example of "first rib". The lower rib 692 is an example of "second rib". The front-rear direction, the rear side and the front side are an example of "first direction", "first side" and "second side", respectively. The boss portion 694 is an example of "protruding part".

While specific examples of the present disclosure have been described above in detail, these examples are merely illustrative and place no limitation on the scope of the patent claims. The technology described in the patent claims also encompasses various changes and modifications to the specific examples described above.

(First Variant) In the first embodiment to the third embodiment, the upper ribs 50, 638 of the body cases 12, 612 may not surround the entire peripheries of the openings 40, 636. For example, the upper ribs 50, 638 may surround only the rear side, right side and left side. In another variant, in the first and second embodiments, the upper rib 50 may surround only the rear side of the opening 40. In yet another variant, in the third embodiment, the upper rib 638 may surround only the rear side of the opening 636.

(Second Variant) In the first embodiment to the third embodiment, the terminal units 14, 618 may not include the lower ribs 110, 692.

(Third Variant) In the first embodiment and the second embodiment, the upper surface of the center upper wall 34 of the body case 12 may be substantially parallel to a plane including the front-rear direction and the left-right direction. In the first to third embodiments, the upper surface of the inner upper wall 632 of the body case 612 may be substantially parallel to a plane including the front-rear direction and the left-right direction.

(Fourth Variant) In the first embodiment to the third embodiment, under the state where the terminal units 14, 618 are attached to the body case 12, 612, movement of the terminal units 14, 618 in the horizontal direction with respect to the body cases 12, 612 may be restricted. For example, the terminal units 14, 618 may be screwed to the body cases 12, 612 in the left-right direction and the front-rear direction.

(Fifth Variant) In the first embodiment and the second embodiment, the body case 12 may include two through holes facing each other across the opening 40 in the front-rear direction. In another variant, in the first and second embodiments, the body case 12 may include only one through hole. In yet another embodiment, in the third embodiment, the body case 612 may include two through holes facing each other across the opening 636 in the front-rear direction. In yet another variant, in the third embodiment, the body case 612 may include two through holes facing each other across the opening 636 in the left-right direction.

(Sixth Variant) In the first embodiment and the second embodiment, the hook 16 may be attached to the terminal unit 14 inside the body case 12.

(Seventh Variant) In the third embodiment, the charger 610 may not include the terminal cover 616.

(Eighth Variant) "Electrical apparatus" is not limited to the chargers 10, 610 and may be a working machine such as a lawnmower.

The technical elements explained in the present description or drawings provide technical utility either independently or through various combinations. The present disclosure is not limited to the combinations recited in the claims as originally filed. Further, the purpose of the examples illustrated by the present description or drawings is to satisfy multiple objectives simultaneously, and satisfying any one of those objectives gives technical utility to the present disclosure.

The invention claimed is:

1. An electrical apparatus to which a battery pack including a battery-side terminal is to be detachably attached, the electrical apparatus comprising:
   a body case comprising an upper wall having an opening and a bottom wall; and
   a terminal unit covering the opening from above and including an apparatus-side terminal corresponding to the battery-side terminal,
   wherein a first rib extending upward from an upper surface of the upper wall is disposed at least partially around the opening, and
   when the electrical apparatus is viewed from above, the first rib overlaps the terminal unit.

2. The electrical apparatus according to claim 1, wherein the first rib is in contact with a lower surface of the terminal unit.

3. The electrical apparatus according to claim 1, wherein a second rib extending downward from a lower surface of the terminal unit is disposed at the lower surface, and the first rib faces the second rib.

4. The electrical apparatus according to claim 1, wherein an inclined portion is disposed on the upper surface, the inclined portion inclines such that a first side of a first direction orthogonal to an up-down direction is located lower than a second side of the first direction, and in the first direction, the first rib is disposed on the second side of the opening.

5. The electrical apparatus according to claim 1, wherein the body case comprises a through hole penetrating the upper wall in the up-down direction, the terminal unit comprises a protruding part extending downward from a lower surface of the terminal unit, the protruding part having a shape corresponding to the through hole and configured to have a screw attached from below, a diameter of the through hole is larger than an outer diameter of the protruding part, an outer diameter of a flange of the screw is larger than the diameter of the through hole, and when the screw is screwed into the protruding part, the body case is clamped by the screw and the terminal unit in the up-down direction.

6. The electrical apparatus according to claim 5, wherein the body case includes the two through holes, the two through holes face each other across the opening, and the terminal unit comprises the two protruding parts corresponding to the two through holes.

7. The electrical apparatus according to claim 1, further comprising a hook attached to the terminal unit outside the body case and configured to engage with a groove of the battery pack.

8. The electrical apparatus according to claim 1, further comprising a terminal cover attached to an upper wall of the body case, and the terminal cover covers a part of the terminal unit and a part of the upper wall from above.

9. The electrical apparatus according to claim 1, wherein the electrical apparatus is a charger.

10. An electrical apparatus to which a battery pack including a battery-side terminal is to be detachably attached, the electrical apparatus comprising:

a body case comprising an upper wall having an opening and a bottom wall; and a terminal unit covering the opening from above and including an apparatus-side terminal corresponding to the battery-side terminal, wherein a first rib extending upward from an upper surface of the upper wall is disposed at least partially around the opening, and when the electrical apparatus is viewed from above, the first rib overlaps the terminal unit, wherein the first rib is in contact with a lower surface of the terminal unit, wherein a second rib extending downward from a lower surface of the terminal unit is disposed at the lower surface, and the first rib faces the second rib, wherein an inclined portion is disposed on the upper surface, the inclined portion inclines such that a first side of a first direction orthogonal to an up-down direction is located lower than a second side of the first direction, and in the first direction, the first rib is disposed on the second side of the opening, wherein the body case comprises a through hole penetrating the upper wall in the up-down direction, the terminal unit comprises a protruding part extending downward from a lower surface of the terminal unit, the protruding part having a shape corresponding to the through hole and configured to have a screw attached from below, a diameter of the through hole is larger than an outer diameter of the protruding part, an outer diameter of a flange of the screw is larger than the diameter of the through hole, and when the screw is screwed into the protruding part, the body case is clamped by the screw and the terminal unit in the up-down direction, wherein the body case includes the two through holes, the two through holes face each other across the opening, and the terminal unit comprises the two protruding parts corresponding to the two through holes, wherein the electrical apparatus further comprises a hook attached to the terminal unit outside the body case and configured to engage with a groove of the battery pack, wherein the electrical apparatus further comprises a terminal cover attached to an upper wall of the body case, and the terminal cover covers a part of the terminal unit and a part of the upper wall from above, wherein the electrical apparatus is a charger.

* * * * *